United States Patent
Karavany et al.

(10) Patent No.: US 12,544,212 B2
(45) Date of Patent: Feb. 10, 2026

(54) AORTIC PRESSURE LOSS REDUCTION APPARATUS AND METHODS

(71) Applicant: HEMODYNAMX-TECHNOLOGIES LTD, Moddin (IL)

(72) Inventors: Sagy Karavany, Kibbutz Dvir (IL); Menashe Yacoby, Shoham (IL); Tanhum Feld, Moshav Merhavya (IL)

(73) Assignee: HEMODYNAMX-TECHNOLOGIES LTD, Moddin (IL)

( * ) Notice: Subject to any disclaimer, the term of this patent is extended or adjusted under 35 U.S.C. 154(b) by 995 days.

(21) Appl. No.: 17/611,668

(22) PCT Filed: May 20, 2020

(86) PCT No.: PCT/IB2020/054761
§ 371 (c)(1),
(2) Date: Nov. 16, 2021

(87) PCT Pub. No.: WO2020/234787
PCT Pub. Date: Nov. 26, 2020

(65) Prior Publication Data
US 2022/0241063 A1   Aug. 4, 2022

Related U.S. Application Data

(60) Provisional application No. 62/850,656, filed on May 21, 2019.

(51) Int. Cl.
*A61F 2/06* (2013.01)
*A61F 2/07* (2013.01)
(Continued)

(52) U.S. Cl.
CPC .............. *A61F 2/06* (2013.01); *A61F 2/07* (2013.01); *A61F 2/915* (2013.01);
(Continued)

(58) Field of Classification Search
CPC .................. A61F 250/001; A61F 2250/0039
See application file for complete search history.

(56) References Cited

U.S. PATENT DOCUMENTS 5,139,515 A   8/1992   Robicsek
6,120,534 A   9/2000   Ruiz
(Continued)

FOREIGN PATENT DOCUMENTS

CN   101287424 A   10/2008
EP     1849440 A1   10/2007
(Continued)

OTHER PUBLICATIONS

Non-Final Office Action for U.S. Appl. No. 17/526,053 mailed Jan. 12, 2023.
(Continued)

*Primary Examiner* — Rebecca S Preston
(74) *Attorney, Agent, or Firm* — Ballard Spahr LLP

(57) ABSTRACT

Apparatus and methods are described including an aortic pressure-loss-reduction device (20) configured to be implanted inside an ascending aorta of a subject. The aortic pressure-loss-reduction device includes a frame (52) that defines an upstream anchor portion (33F), an intermediate portion (23F) configured to define a conduit (26) therethrough, and a downstream anchor portion (31F). Angled struts (150) are disposed between a downstream end of the upstream anchor portion (33F) and an upstream end of the intermediate portion (23F). The angled struts (150) are configured such that, in response to a diameter of the upstream anchor portion (33F) changing by an absolute amount, an absolute change in a diameter of the upstream end of the intermediate portion (23F) is less than the
(Continued)

absolute amount by which the diameter of the upstream anchor portion (33F) changes. Other applications are also described.

25 Claims, 12 Drawing Sheets

(51) Int. Cl.
  *A61F 2/915* (2013.01)
  *A61F 2/848* (2013.01)

(52) U.S. Cl.
  CPC . *A61F 2002/068* (2013.01); *A61F 2002/8486* (2013.01); *A61F 2002/91525* (2013.01); *A61F 2002/91541* (2013.01); *A61F 2002/91575* (2013.01); *A61F 2220/0075* (2013.01); *A61F 2230/001* (2013.01); *A61F 2230/0067* (2013.01); *A61F 2230/0078* (2013.01); *A61F 2250/001* (2013.01); *A61F 2250/0039* (2013.01)

(56) References Cited

U.S. PATENT DOCUMENTS

| | | | |
|---|---|---|---|
| 7,018,404 | B2 | 3/2006 | Holmberg et al. |
| 7,429,269 | B2 | 9/2008 | Schwammenthal et al. |
| 7,766,814 | B2 | 8/2010 | Walsh |
| 8,585,572 | B2 | 11/2013 | Mehmanesh |
| 8,623,065 | B2 | 1/2014 | Lau et al. |
| 8,715,337 | B2 | 5/2014 | Chuter |
| 9,232,992 | B2 | 1/2016 | Heidner et al. |
| 10,368,985 | B2 | 8/2019 | Wilson et al. |
| 10,568,731 | B2 | 2/2020 | Karavany et al. |
| 11,207,200 | B2 * | 12/2021 | Karavany ............ A61F 2/9662 |
| 11,224,503 | B2 | 1/2022 | Karavany et al. |
| 2003/0045828 | A1 | 3/2003 | Wilk |
| 2004/0093058 | A1 | 5/2004 | Cottone et al. |
| 2004/0249439 | A1 | 12/2004 | Richter et al. |
| 2004/0260389 | A1 | 12/2004 | Case et al. |
| 2005/0055082 | A1 * | 3/2005 | Ben Muvhar ............ A61F 2/91 623/1.15 |
| 2005/0222674 | A1 | 10/2005 | Paine |
| 2005/0228480 | A1 * | 10/2005 | Douglas ............ A61F 2/06 623/1.13 |
| 2006/0009835 | A1 | 1/2006 | Osborne et al. |
| 2006/0106449 | A1 | 5/2006 | Ben |
| 2006/0149360 | A1 | 7/2006 | Schwammenthal et al. |
| 2006/0178552 | A1 | 8/2006 | Gross |
| 2006/0259134 | A1 | 11/2006 | Schwammenthal et al. |
| 2006/0271171 | A1 | 11/2006 | Mcquinn et al. |
| 2007/0185565 | A1 | 8/2007 | Schwammenthal et al. |
| 2007/0293808 | A1 | 12/2007 | Williams et al. |
| 2008/0071361 | A1 | 3/2008 | Tuval et al. |
| 2008/0071363 | A1 | 3/2008 | Tuval et al. |
| 2009/0105805 | A1 | 4/2009 | Baker et al. |
| 2009/0198315 | A1 | 8/2009 | Boudjemline |
| 2009/0210047 | A1 | 8/2009 | Amplatz et al. |
| 2009/0222078 | A1 | 9/2009 | Greenberg |
| 2009/0240320 | A1 | 9/2009 | Tuval et al. |
| 2009/0270965 | A1 | 10/2009 | Sinha et al. |
| 2010/0023046 | A1 | 1/2010 | Heidner et al. |
| 2010/0145433 | A1 | 6/2010 | Anukhin et al. |
| 2011/0288634 | A1 | 11/2011 | Tuval et al. |
| 2012/0010690 | A1 | 1/2012 | Richter et al. |
| 2012/0022629 | A1 | 1/2012 | Perera et al. |
| 2013/0013053 | A1 | 1/2013 | Hartley et al. |
| 2013/0144383 | A1 | 6/2013 | Thill et al. |
| 2013/0178750 | A1 | 7/2013 | Sheehan et al. |
| 2014/0121757 | A1 * | 5/2014 | Debruyne ............ A61F 2/95 623/1.13 |
| 2014/0222142 | A1 * | 8/2014 | Kovalsky ............ A61F 2/2418 623/2.17 |
| 2014/0257474 | A1 | 9/2014 | Roeder |
| 2015/0238315 | A1 | 8/2015 | Rabito et al. |
| 2015/0366693 | A1 | 12/2015 | Kagan et al. |
| 2017/0042551 | A1 | 2/2017 | Celermajer et al. |
| 2017/0340460 | A1 | 11/2017 | Rosen |
| 2018/0036109 | A1 | 2/2018 | Karavany et al. |
| 2018/0353281 | A1 | 12/2018 | Nussinovitch |
| 2019/0183629 | A1 * | 6/2019 | Karavany ............ A61F 2/966 |
| 2021/0169634 | A1 | 6/2021 | Karavany et al. |
| 2022/0071788 | A1 | 3/2022 | Karavany et al. |

FOREIGN PATENT DOCUMENTS

| | | |
|---|---|---|
| EP | 2016961 B1 | 2/2010 |
| EP | 2777618 A1 | 9/2014 |
| EP | 2896387 A1 | 7/2015 |
| EP | 2785277 B1 | 4/2017 |
| JP | 2001527453 A | 12/2001 |
| JP | 2007526789 A | 9/2007 |
| JP | 2008537891 A | 10/2008 |
| JP | 2011502628 A | 1/2011 |
| WO | 9852476 A1 | 11/1998 |
| WO | 03028522 A2 | 4/2003 |
| WO | 2005002466 A2 | 1/2005 |
| WO | 2005084730 A1 | 9/2005 |
| WO | 2006070372 A2 | 7/2006 |
| WO | 2006080010 A2 | 8/2006 |
| WO | 2009061419 A1 | 5/2009 |
| WO | 2012018590 A1 | 2/2012 |
| WO | 2015013344 A2 | 1/2015 |
| WO | 2016128983 A1 | 8/2016 |
| WO | 2018029688 A1 | 2/2018 |
| WO | 2018220589 A1 | 12/2018 |
| WO | 2019097424 A2 | 5/2019 |
| WO | 2020234787 A1 | 11/2020 |

OTHER PUBLICATIONS

Communication Pursuant to Article 94(3) EPC for European Patent Application No. 16748842.8 mailed Jun. 17, 2022.
Examination Report for European Application No. 16748842.8 mailed Jun. 17, 2022.
First Action Interview Pilot Program Pre-Interview Communication for U.S. Appl. No. 16/743,721 mailed Dec. 3, 2021.
Issue Notification for U.S. Appl. No. 16/322,047 mailed Dec. 28, 2021.
Issue Notification for U.S. Appl. No. 16/763,884 mailed Dec. 8, 2021.
Issue Notification for U.S. Appl. No. 16/743,721 mailed May 25, 2022.
Notice of Allowance for U.S. Appl. No. 16/743,721 mailed Feb. 22, 2022.
Hearing Notice for Indian Application No. 201717029373 mailed Jan. 18, 2024.
Issue Notification for U.S. Appl. No. 17/526,053 mailed Dec. 20, 2023.
Notice of Allowance for U.S. Appl. No. 17/526,053 mailed Aug. 30, 2023.
European Search Report for European Application No. 16748842.8 mailed Sep. 19, 2018.
Examination Report for Indian Application No. 201717029373 mailed Oct. 8, 2020.
Extended European Search Report for European Application No. 18878693.3 mailed Jul. 8, 2021.
Final Office Action for U.S. Appl. No. 15/550,661 mailed Jun. 19, 2019.
International Search Report and Written Opinion from International Application No. PCT/IB2018/058961 mailed May 8, 2019.
International Search Report and Written Opinion from International Application No. PCT/IB2020/054761 mailed Oct. 28, 2020.
International Search Report and Written Opinion from International Application No. PCT/IL2016/050170 mailed Jun. 10, 2016.
International Search Report and Written Opinion from International Application No. PCT/IL2017/050884 mailed Oct. 30, 2017.
Issue Notification for U.S. Appl. No. 15/550,661 mailed Feb. 5, 2020.

(56) References Cited

OTHER PUBLICATIONS

Non-Final Office Action for U.S. Appl. No. 15/550,661 mailed Aug. 6, 2019.
Non-Final Office Action for U.S. Appl. No. 15/550,661 mailed Feb. 20, 2019.
Non-Final Office Action for U.S. Appl. No. 16/322,047 mailed Mar. 3, 2021.
Notice of Allowance for U.S. Appl. No. 15/550,661 mailed Oct. 17, 2019.
Notice of Allowance for U.S. Appl. No. 16/322,047 mailed Sep. 14, 2021.
Notice of Allowance for U.S. Appl. No. 16/763,884 mailed Aug. 16, 2021.
Office Action for Chinese Application No. 201680015323.5 mailed Dec. 14, 2018.
Office Action for Chinese Application No. 201780049360.2 mailed May 25, 2021.
Office Action for Chinese Application No. 201780049360.2 mailed Oct. 10, 2020.
Office Action for Chinese Application No. 201910988467.4 mailed May 24, 2021.
Office Action for Japanese Application No. 2017-542883 mailed Dec. 10, 2019.
Protege webpage—downloaded Mar. 19, 2015.
Restriction Requirement for U.S. Appl. No. 15/550,661 mailed Dec. 4, 2018.
Restriction Requirement for U.S. Appl. No. 16/743,721 mailed Sep. 1, 2021.
Supplemental Notice of Allowability for U.S. Appl. No. 15/550,661 mailed Jan. 23, 2020.
U.S. Appl. No. 15/550,661, filed Aug. 11, 2017.
U.S. Appl. No. 16/322,047, filed Jan. 30, 2019.
U.S. Appl. No. 16/743,721, filed Jan. 15, 2020.
U.S. Appl. No. 16/763,884, filed May 13, 2020.
U.S. Appl. No. 17/526,053, filed Nov. 15, 2021.
U.S. Appl. No. 62/115,207, filed Feb. 12, 2015.
U.S. Appl. No. 62/265,571, filed Dec. 10, 2015.
U.S. Appl. No. 62/373,993, filed Aug. 12, 2016.
U.S. Appl. No. 62/586,258, filed Nov. 15, 2017.
U.S. Appl. No. 62/630,406, filed Feb. 14, 2018.
U.S. Appl. No. 62/850,656, filed May 21, 2019.
Heinrich, et al., "Experimental analysis of fluid mechanical energy losses in aortic valve stenosis: importance of pressure recovery", Annals of biomedical engineering, 1996, pp. 685-694.
Examination Report for European Application No. 17755260.1 mailed Jun. 1, 2023.
Office Action for Chinese Application No. 201880086395.8 mailed Jan. 18, 2023.
Non-Final Office Action for U.S. Appl. No. 18/520,223 mailed Apr. 16, 2025.

* cited by examiner

AORTIC PRESSURE LOSS REDUCTION APPARATUS AND METHODS

CROSS-REFERENCE TO RELATED APPLICATIONS

The present application is the U.S. national phase of International Application No. PCT/IB2020/054761 to Karavany (published as WO 20/234787), filed May 20, 2020, which claims priority from U.S. Provisional Application 62/850,656 to Karavany, filed May 21, 2019, entitled "Aortic pressure loss reduction apparatus and method," which is incorporated herein by reference.

FIELD OF EMBODIMENTS OF THE INVENTION

Some applications of the present invention generally relate to medical apparatus. Specifically, some applications of the present invention relate to an aortic pressure-loss-reduction device and methods of use thereof.

BACKGROUND

Aortic valve stenosis is a common disease in which calcification of the cusps of the aortic valve cause the flexibility of the valve to be compromised and the open valve area to diminish. Once aortic valve stenosis develops, due to the reduction in the aortic valve diameter, blood flow is compromised. Aortic valve stenosis often progresses to heart failure and other life-threatening conditions.

SUMMARY OF EMBODIMENTS

In accordance with some applications of the present invention, an aortic pressure-loss-reduction device is implanted in a subject's ascending aorta. The device typically includes a frame and a material that is configured to impede blood flow therethrough coupled to at least a portion of the frame. Typically, in a non-constrained configuration of the device, the frame defines (a) an upstream anchor portion configured to radially expand against the inner wall of the ascending aorta, such as to anchor an upstream end of the aortic pressure-loss-reduction device to the subject's ascending aorta, (b) an intermediate portion that defines a conduit therethrough, such that blood is configured to flow through the device via the conduit, at least a portion of the conduit diverging, such that a downstream end of the diverging portion has a greater cross-sectional area than an upstream end of the diverging portion, and (c) a downstream anchor portion configured to radially expand against the inner wall of the ascending aorta, such as to anchor the downstream end of the aortic pressure-loss-reduction device to the subject's ascending aorta.

For some applications, a first set of angled struts are disposed between the downstream end of the upstream anchor portion and the upstream end of the intermediate portion. The angled struts are typically shaped to form a folded portion between the downstream end of the upstream anchor portion and the upstream end of the intermediate portion. For some applications, the angled struts are configured such that, in response to the diameter of the upstream anchor portion changing by an absolute amount, an absolute change in the diameter of the upstream end of the intermediate portion is less than the absolute amount by which the diameter of the upstream anchor portion changes. For some applications, the angled struts are curved, for example, the angled struts may define a sinusoidal curvature. Typically, the angled struts are configured such that a ratio of the absolute change in the diameter of the upstream end of the intermediate portion to the absolute amount by which the diameter of the upstream anchor portion changes is less than 1:2. For some applications, the angled struts are configured such that, in response to the diameter of the upstream anchor portion decreasing, the diameter of the upstream end of the intermediate portion increases. Typically, the angled struts are angled with respect to the length of the frame, in that a first end of each of the struts (which is coupled to an upstream end of the intermediate portion of the frame) is not axially aligned with the second end of the strut (which is coupled to the upstream anchor portion of the frame). The angled struts are typically configured such that, when the pressure-loss-reduction device is disposed in a non-radially-constrained configuration, the struts define a circumferential curvature with respect to the longitudinal axis of the device.

For some applications, a second set of angled struts are disposed between the upstream end of the downstream anchor portion and the downstream end of the intermediate portion. The second set of angled struts are typically shaped to form a folded portion between the upstream end of the downstream anchor portion and the downstream end of the intermediate portion, and such that, in response to the diameter of the downstream anchor portion changing by an absolute amount, an absolute change in the diameter of the downstream end of the intermediate portion is less than the absolute amount by which the diameter of the downstream anchor portion changes. For some applications, the second set of angled struts are configured such that, in response to diameters of both the upstream and the downstream anchor portions decreasing, torque that is generated at the upstream end of the intermediate portion (by the first set of angled struts), is at least partially cancelled by torque generated at the downstream end of the intermediate portion (by the second set of angled struts). Typically, the angled struts are angled with respect to the length of the frame, in that a first end of each of the struts (which is coupled to a downstream end of the intermediate portion of the frame) is not axially aligned with the second end of the strut (which is coupled to the downstream anchor portion of the frame). The angled struts are typically configured such that, when the pressure-loss-reduction device is disposed in a non-radially-constrained configuration, the struts define a circumferential curvature with respect to the longitudinal axis of the device.

For some applications, the aortic pressure-loss-reduction device is configured, such that the intermediate portion of the device is (a) longitudinally fixed with respect to the ascending aorta by the upstream anchor portion and the downstream anchor portion exerting radial force against the inner wall of the aorta and (b) able to adjust the angle that a longitudinal axis of the intermediate portion makes with longitudinal axes of the upstream and downstream anchor portions, by the first and second sets of angled struts acting as hinges about which the intermediate portion can flex. Alternatively or additionally, the aortic pressure-loss-reduction device is configured such that, by virtue of flexibility of first and second sets of angled struts, a length of the intermediate portion does not change even if the distance between the upstream and downstream anchor portions changes.

For some applications, an upstream end of the intermediate portion is reinforced with respect to at least a central portion of the intermediate portion, such that in response to the diameter of the upstream anchor portion changing by an absolute amount, an absolute change in the diameter of the upstream end of the intermediate portion is less than the absolute amount by which the diameter of the upstream anchor portion changed. For example, a ratio of the absolute change in the diameter of the upstream end of the intermediate portion to the absolute amount by which the diameter of the upstream anchor portion changed may be less than 1:2. For some applications, the upstream end of the intermediate portion is reinforced with respect to at least a central portion of the intermediate portion by struts of the upstream end of the intermediate portion forming closed cells. Alternatively or additionally, the upstream end of the intermediate portion is reinforced with respect to at least a central portion of the intermediate portion by the struts of the upstream end being shorter than the struts of the central portion of the intermediate portion, and/or being wider than the struts of the central portion of the intermediate portion.

Typically, the intermediate portion of the frame is configured to be flexible, such that at least upon the aortic pressure-loss-reduction device being implanted inside the subject's ascending aorta, the intermediate portion of the frame curves such as to conform with a curvature of the ascending aorta. For example, the intermediate portion of the frame is configured to be flexible, by the intermediate portion of the frame including struts that form a spiral.

It is noted that upon being deployed in the ascending aorta, the aortic pressure-loss-reduction device typically only undergoes changes in shape in a passive manner (e.g., due to changes in shape of portions of the subject's body, such as the aorta). Upon being deployed in the ascending aorta, the shape of the aortic pressure-loss-reduction device is typically not changed in an active manner.

There is therefore provided, in accordance with some applications of the present invention, apparatus including:
an aortic pressure-loss-reduction device configured to be implanted inside an ascending aorta of a subject, the aortic pressure-loss-reduction device including:
a frame that is configured, in a non-constrained configuration thereof, to define:
an upstream anchor portion configured to radially expand against an inner wall of a subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against an inner wall of a subject's ascending aorta, such as to anchor a downstream end of the aortic pressure-loss-reduction device to the subject's ascending aorta;
a first set of angled struts disposed between a downstream end of the upstream anchor portion and an upstream end of the intermediate portion, the angled struts being shaped to form a folded portion between the downstream end of the upstream anchor portion and the upstream end of the intermediate portion;
the angled struts being configured such that, in response to a diameter of the upstream anchor portion changing by an absolute amount, an absolute change in a diameter of the upstream end of the intermediate portion is less than the absolute amount by which the diameter of the upstream anchor portion changes; and
a material layer coupled to at least a portion of the frame, the material layer configured to impede blood flow therethrough.

In some applications, the angled struts define a sinusoidal curvature. In some applications, the angled struts are configured such that a ratio of the absolute change in the diameter of the upstream end of the intermediate portion to the absolute amount by which the diameter of the upstream anchor portion changes is less than 1:2. In some applications, the angled struts are configured such that in response to the diameter of the upstream anchor portion decreasing, the diameter of the upstream end of the intermediate portion increases.

In some applications, the material layer is coupled to an outside of at least a portion of the frame. In some applications, the material layer is coupled to an inside of at least a portion of the frame. In some applications, at least a portion of the frame is embedded within the material layer.

In some applications, the angled struts are configured such that, when the frame is in its non-radially-constrained configuration, a distance from an upstream end of the upstream anchor portion to an upstream end of the intermediate portion is less than 15 mm. In some applications, the angled struts are configured such that, when the frame is in its non-radially-constrained configuration, an upstream end of the conduit extends beyond an upstream end of the upstream anchor portion in the upstream direction.

In some applications, in the non-constrained configuration of the frame, the angled struts define a circumferential curvature with respect to a longitudinal axis of the frame. In some applications, the angled struts are configured such that, in response to the diameter of the upstream anchor portion decreasing, the circumferential curvature of the struts with respect to longitudinal axis of the frame increases. In some applications, the angled struts are configured such that, by virtue of the increase in the circumferential curvature of the struts with respect to longitudinal axis of the frame, the difference between the diameter of the upstream end of the intermediate portion and the diameter of the upstream anchor portion decreases.

In some applications, the upstream end of the intermediate portion is reinforced with respect to at least a longitudinally-central portion of the intermediate portion. In some applications, the upstream end of the intermediate portion and the longitudinally-central portion of the intermediate portion include struts, and the upstream end of the intermediate portion is reinforced with respect to at least the longitudinally-central portion of the intermediate portion by struts of the upstream end of the intermediate portion being reinforced with supporting struts that face in an opposite direction from the struts of the upstream end of the intermediate portion. In some applications, the upstream end of the intermediate portion and the longitudinally-central portion of the intermediate portion include struts, and the upstream end of the intermediate portion is reinforced with respect to at least the longitudinally-central portion of the intermediate portion by the struts of the upstream end of the intermediate portion forming closed cells. In some applications, the upstream end of the intermediate portion and the longitudinally-central portion of the intermediate portion include struts, and the upstream end of the intermediate portion is reinforced with respect to at least the longitudinally-central portion of the intermediate portion by the struts of the upstream end being shorter than the struts of the longitudinally-central portion of the intermediate portion. In some applications, the upstream end of the intermediate portion and the longitudinally-central portion of the intermediate portion include struts, and the upstream end of the intermediate portion is reinforced with respect to at least the longitudinally-central portion of the intermediate portion by the struts of the upstream end being wider than the struts of the longitudinally-central portion of the intermediate portion.

In some applications, the apparatus further includes a second set of angled struts disposed between an upstream end of the downstream anchor portion and a downstream end of the intermediate portion, the second set of angled struts being shaped to form a folded portion between the upstream end of the downstream anchor portion and the downstream end of the intermediate portion. In some applications, in the non-constrained configuration of the frame, the first set of angled struts define a circumferential curvature with respect to a longitudinal axis of the frame in a given circumferential direction, and the second set of angled struts define a circumferential curvature with respect to a longitudinal axis of the frame in the given circumferential direction. In some applications, the second set of angled struts are configured such that, in response to a diameter of the downstream anchor portion changing by an absolute amount, an absolute change in a diameter of the downstream end of the intermediate portion is less than the absolute amount by which the diameter of the downstream anchor portion changes. In some applications, the second set of angled struts are configured such that, in response to diameters of both the upstream and the downstream anchor portions decreasing, torque that is generated at the upstream end of the intermediate portion, by the first set of angled struts, is at least partially cancelled by torque generated at the downstream end of the intermediate portion, by the second set of angled struts.

In some applications, the aortic pressure-loss-reduction device is configured, such that the intermediate portion of the device is (a) longitudinally fixed with respect to the ascending aorta by the upstream anchor portion and the downstream anchor portion exerting radial force against the inner wall of the aorta and (b) able to adjust the angle that a longitudinal axis of the intermediate portion makes with longitudinal axes of the upstream and downstream anchor portions, by the first and second sets of angled struts acting as hinges about which the intermediate portion can flex. In some applications, the aortic pressure-loss-reduction device is configured such that, by virtue of flexibility of first and second sets of angled struts, a length of the intermediate portion does not change even if a distance between the upstream and downstream anchor portions changes.

In some applications, the struts belonging to the first set of angled struts are longer than the struts belonging to the second set of angled struts.

In some applications, the intermediate portion of the frame is configured to be flexible, such that at least upon the aortic pressure-loss-reduction device being implanted inside the subject's ascending aorta, the intermediate portion of the frame curves such as to conform with a curvature of the ascending aorta. In some applications, the intermediate portion of the frame is configured to be flexible, by the intermediate portion of the frame including struts that form a spiral.

There is further provided, in accordance with some applications of the present invention, apparatus including:
an aortic pressure-loss-reduction device configured to be implanted inside an ascending aorta of a subject, the aortic pressure-loss-reduction device including:
a frame that is configured, in a non-constrained configuration thereof, to define:
an upstream anchor portion configured to radially expand against an inner wall of a subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against an inner wall of a subject's ascending aorta, such as to anchor a downstream end of the aortic pressure-loss-reduction device to the subject's ascending aorta;
a first set of struts disposed between a downstream end of the upstream anchor portion and an upstream end of the intermediate portion, the struts being shaped to form a folded portion between the downstream end of the upstream anchor portion and the upstream end of the intermediate portion;
the intermediate portion including one or more rows of extension struts that extend the intermediate portion proximally beyond the folded portion between the downstream end of the upstream anchor portion and the upstream end of the intermediate portion; and
a material layer coupled to at least a portion of the frame, the material layer configured to impede blood flow therethrough.

There is further provided, in accordance with some applications of the present invention, apparatus including:
an aortic pressure-loss-reduction device configured to be implanted inside an ascending aorta of a subject, the aortic pressure-loss-reduction device including:
a frame that is configured, in a non-constrained configuration thereof, to define:
an upstream anchor portion configured to radially expand against an inner wall of a subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against an inner wall of a subject's ascending aorta, such as to anchor a downstream end of the aortic pressure-loss-reduction device to the subject's ascending aorta;
a first piece of material coupled to the downstream anchor portion, the first piece of material configured to impede blood flow therethrough; and
a second piece of material coupled to the downstream anchor portion, the second piece of material configured to impede blood flow therethrough,
the second piece of material being stitched to the first piece of material at a longitudinal location that varies around a circumference of the device when the device is disposed in a radially-constrained configuration.

The present invention will be more fully understood from the following detailed description of embodiments thereof, taken together with the drawings, in which:

DETAILED DESCRIPTION OF EMBODIMENTS

Figure 1A:
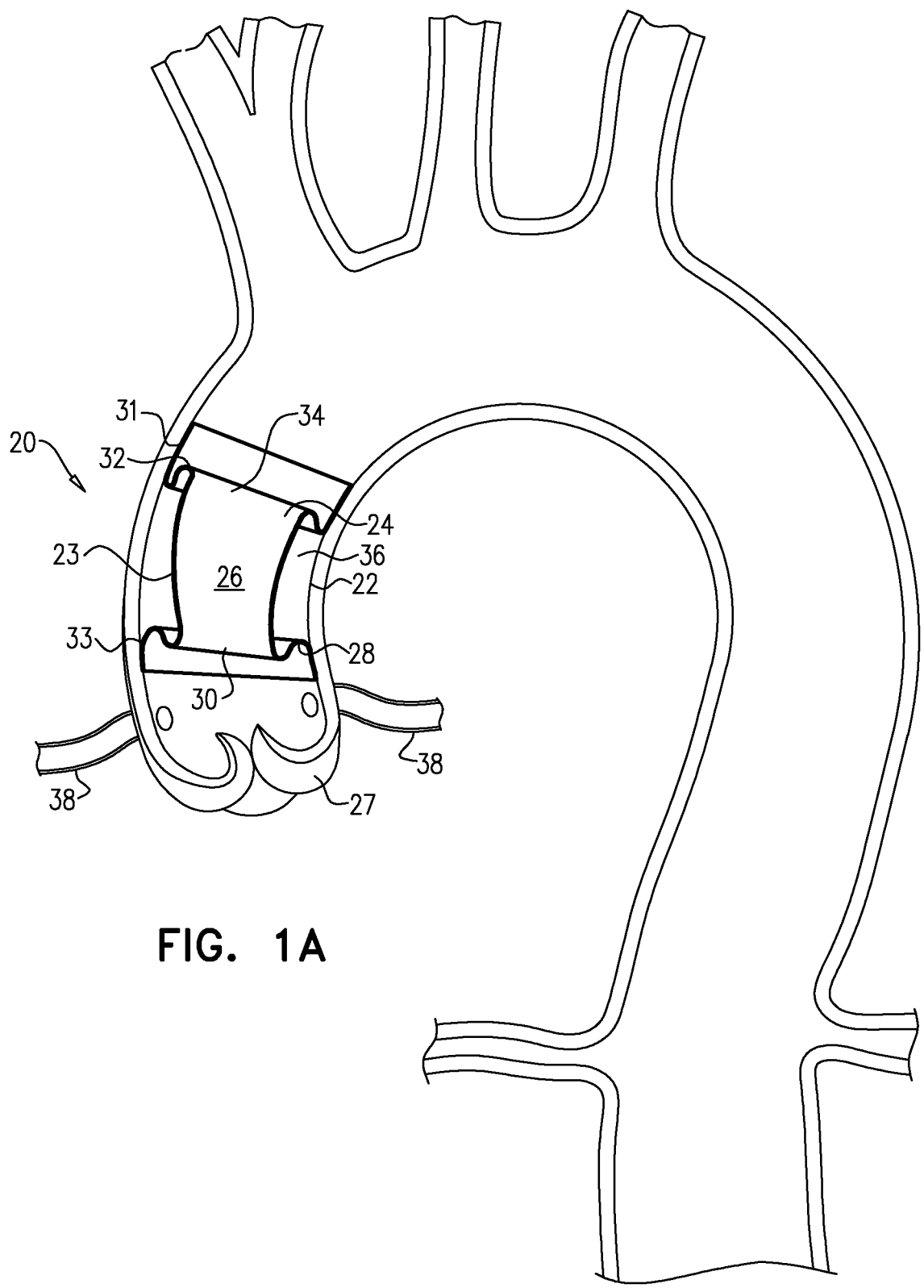
FIGS. 1A and 1B are schematic illustrations of an implantable pressure-loss-reduction device configured to be deployed inside a subject's aorta, in accordance with some applications of the present invention.
Figure 1B:
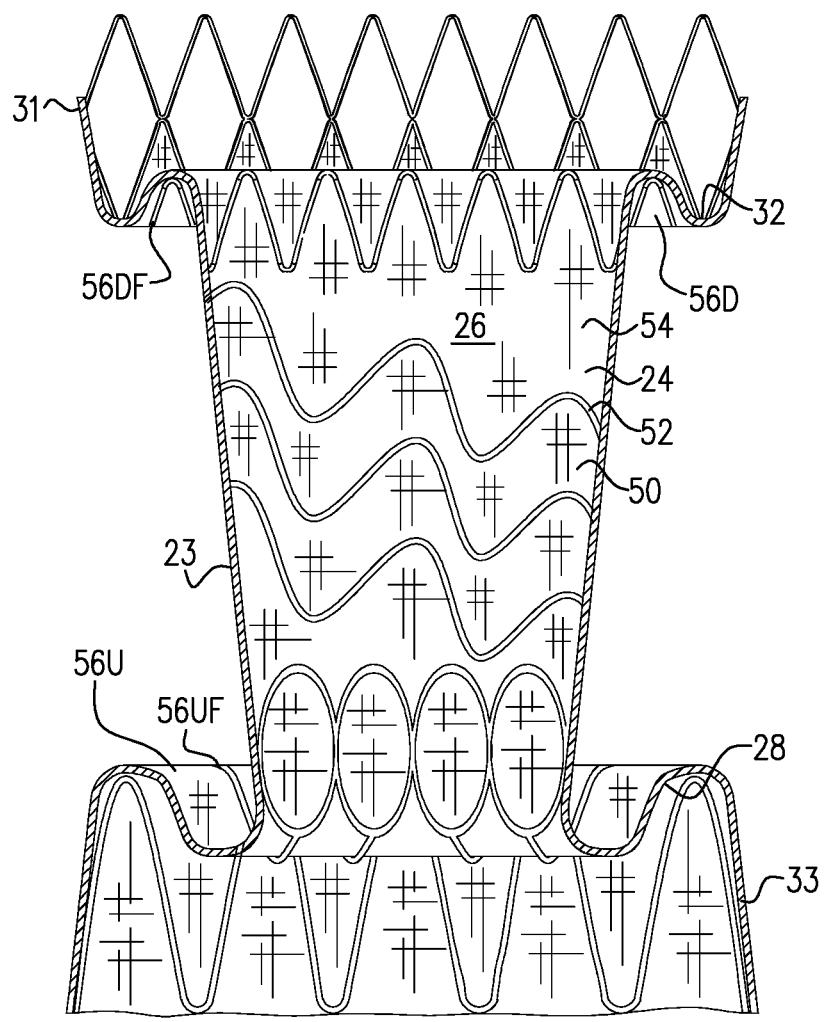

Reference is now made to FIGS. 1A and 1B, which are schematic illustrations of an implantable pressure-loss-reduction device 20 deployed inside a subject's ascending aorta 22, in accordance with some applications of the present invention. FIG. 1A shows the device deployed inside the ascending aorta, and FIG. 1B shows a slice view of the device in a non-constrained configuration (i.e., in the absence of any external force acting upon the device). As shown, device 20 defines an intermediate portion 23 that has an inner surface 24 that defines a conduit 26 through the device, from the upstream end of the device to the downstream end of the device. At least a portion of the conduit diverges in a direction from an upstream end 30 of the conduit to a downstream end 34 of the conduit, such that the cross-sectional area of the conduit at the downstream end is greater than the cross-sectional area of the conduit at the upstream end. In addition, the device is configured such that at least upon being placed inside the subject's ascending aorta, the conduit is curved (i.e., the conduit defines a curved longitudinal axis), such as to conform at least partially to the curvature of the ascending aorta.

Typically, the device is configured such that in its non-constrained configuration at least a portion of the conduit 26 diverges, but the conduit 26 is not curved, as shown in FIG. 1B. For such applications, the intermediate portion of the device is typically configured to be flexible, such that upon being deployed within the ascending aorta, the intermediate portion of the device becomes curved such as to conform at least partially to the curvature of the ascending aorta. For some applications, the device is configured such that even in its non-constrained configuration, at least a portion of conduit 26 diverges, and conduit 26 is also curved. For some applications, the device is configured such that in its non-constrained configuration, a portion of conduit 26 diverges, and is not curved, but rather is disposed at an angle with respect to an upstream anchor 33 of the device (i.e., such that a longitudinal axis of the conduit is disposed at an angle with respect to the longitudinal axis of the upstream anchor).

Pressure-loss-reduction device 20 is typically placed in the ascending aorta of a subject suffering from aortic valve stenosis, in the vicinity of the stenosed aortic valve 27 (e.g., such that the upstream end of the conduit is downstream of the aortic valve, and within 25 mm from the aortic valve tip when the valve is in an open configuration, during systole). The blood exiting the subject's left ventricle, during systole, is directed into conduit 26. The divergence of the conduit is configured to reduce pressure loss of blood flowing through the conduit, relative to the loss of pressure of the blood flowing through the longitudinal portion of the blood vessel in the absence of the device. The conduit reduces the blood pressure loss by reducing the area of flow separation. During diastole, blood flows back toward coronary arteries 38 via conduit 26.

The device is typically deployed within a longitudinal portion of the aorta, such that blood flow through the longitudinal portion of the aorta, via any flow path other than through the conduit, whether in the antegrade or retrograde direction, is less than 20 percent (e.g., less than 10 percent, or less than 5 percent) of the total blood flow through the longitudinal portion of the blood vessel. (In the present application, when used with reference to blood flow, the term "antegrade" refers to blood flowing in the forward direction, and the term "retrograde" refers to blood flowing in a backward direction.) Typically, by directing the blood to flow in the above-described manner, loss of pressure and energy of the blood flow exiting the left ventricle into the ascending aorta is reduced relative to the loss of pressure and energy of the blood flow in the absence of the device. Thus, placement of device 20 in the subject's ascending aorta may decrease the subject's left ventricular pressure, reduce afterload, and/or and improve the subject's cardiac output. For some applications, regulating the blood flow from the aortic valve in the above-described manner may postpone or stop the degradation process leading to further aortic valve stenosis. An unhealthy flow regime in the ascending aorta can cause sequential deposits of thrombi on the valve surface that can cause further valve thickening, deformation and calcification leading to severe stenosis. Device 20, by changing the flow regime, may reduce the inflammatory process that causes the calcification. Thus, device 20 may decrease the degradation of the medical situation of the subject.

It is noted that, typically, device 20 does not include a prosthetic valve disposed within the conduit or at any other location within the device. The device typically performs the functions described herein, without requiring the use of a prosthetic valve of any type.

Typically, the pressure-loss-reduction device includes a downstream anchor 31 at the downstream end of the device that is configured to appose the inner wall of the aorta, and to anchor the downstream end of the device with respect to the aorta by exerting outward radial pressure against the inner wall of the aorta. The device typically defines at least one downstream outer surface 32 that extends from the outside of the conduit to the downstream anchor, which is in contact with the inner wall of the blood vessel. Typically, the at least one surface extends radially outward, around the full circumference of the conduit, from the conduit to the downstream anchor.

Pressure-loss-reduction device 20 typically includes an upstream anchor 33 at the upstream end of the device that is configured to appose the inner wall of the aorta, and to anchor the upstream end of the device with respect to the aorta by exerting outward radial pressure against the inner wall of the aorta. The device typically defines one or more upstream outer surfaces 28 that surround an upstream portion of conduit 26, and that extend at least from outside the conduit to the upstream anchor. Typically, the at least one upstream outer surface is disposed around the conduit at a longitudinal location such that at least a portion of the upstream surface is within the upstream-most 30 percent (e.g., the upstream-most 20 percent) of the length of the conduit.

Typically, upstream and downstream outer surfaces 28 and 32 are configured such that, when pressure-loss-reduction device 20 is deployed inside a longitudinal portion of the subject's aorta, the surfaces substantially impede blood flow through the longitudinal portion, via any flow path other than through conduit 26. For example, the upstream and downstream surfaces may be configured such that, when the device is deployed inside the longitudinal portion of the subject's aorta, flow via flow paths other than through conduit 26, whether in the antegrade or retrograde direction, is less than 20 percent (e.g., less than 10 percent, or less than 5 percent) of total blood flow through the longitudinal portion of the subject's aorta. Typically, the upstream and downstream surfaces are configured such that, when the device is deployed inside the longitudinal portion of the subject's aorta, there is no blood flow through the longitudinal portion of the subject's aorta via any flow path other than through the conduit defined by the inner surface of the device, whether in the antegrade or retrograde direction. For some applications, each of downstream outer surface 32 and upstream outer surface 28 is configured to impede the backflow of blood around the outside of conduit 26 as well as to impede antegrade blood flow around the outside of conduit 26. For some applications, the device includes a single one of the upstream and downstream outer surfaces, and the single surface is configured to impede both antegrade and retrograde blood flow around the outside of conduit 26.

For some applications (not shown), intermediate portion 23 (which has inner surface 24 that defines conduit 26) is disposed eccentrically with respect to one or both of upstream anchor 33 and downstream anchor 31.

Typically, intermediate portion 23 (which has inner surface 24 that defines conduit 26), as well as upstream anchor 33, downstream anchor 31, and surfaces 28 and 32 are all defined by a single continuous portion of stent graft material 50, that is shaped such as to define the respective components of pressure-loss-reduction device 20, as shown in FIG. 1B. The stent graft material is typically formed from a combination of a metal or alloy frame 52 (e.g., a stent made of stainless steel or nitinol or cobalt chromium) and a covering material 54, e.g., a fabric and/or a polymer (such as expanded polytetrafluoroethylene (ePTFE), or woven, knitted and/or braided polyester), which is typically coupled to the frame via stitching, spray coating, encapsulation, electrospinning, dip molding and/or a different technique. In accordance with some applications, a layer of the material is coupled to the inside of at least a portion of the frame, the outside of at least a portion of the frame, and/or at least a portion of the frame is embedded within a layer of the material. Material 54 is typically configured to impede blood flow therethrough, as described in further detail hereinbelow. For some applications, the frame of the stent graft material is a braided stent. For some applications, the braided stent provides flexibility to the device that facilitates insertion of the device via curved portions of the vasculature. For some applications, using a braided stent allows the device to be radially constrained to a narrower diameter than would be possible using a non-braided stent.

For some applications, material 54 is impermeable and prevents blood from flowing back toward the aortic valve during systole (and/or during diastole), outside of the conduit. Alternatively, material 54 is not impermeable, but has a permeability that is sufficiently low as to substantially prevent any blood from flowing through the longitudinal portion of the aorta, via any flow path other than through the conduit defined by the inner surface of the device, in the manner described hereinabove. For some applications, the material has permeability per unit length of less than 0.25 micrometers (i.e., between 0 and 0.25 micrometers), where the permeability per unit length is defined based upon the following equation, which is based upon Darcy's Law: $k/\Delta x = V\mu/\Delta p$, where k is permeability, $\Delta x$ is length (in meters), V is average velocity (in meters per second), $\mu$ is fluid viscosity (measured in Pascal-seconds), and $\Delta P$ is the pressure differential measured in Pascals).

For some applications, material 54 is structured such that there are open spaces between portions of the material. For example, the material may be arranged in a lattice structure, a braided structure, a crisscross structure, a woven structure, a cellular structure, a stitched structure, or a similar structure. Typically, even for such applications, more than 20 percent of the area of each of the surfaces is filled with material, and less than 80 percent of the area of each of the surfaces is open space between the material. Further typically, more than 50 percent, e.g., more than 80 percent, of the area of each of the surfaces is filled with material. For some applications, there are no open spaces within the surfaces (i.e., the entirety of each of the surfaces is filled with material).

For some applications, inner surface 24 that defines conduit 26 is rough. The rough surface of the conduit is configured to act as a turbulator on the boundary layer between the blood and the surface of the conduit, such as to increase adhesion, excite the boundary layer, and delay flow separation.

For some applications, by virtue of having both upstream and downstream outer surfaces, pressure-loss-reduction device 20 is configured to trap any blood that is disposed within a region 36 (FIG. 1A) between the conduit and the inner wall of the aorta within the longitudinal portion of the aorta in which the device is placed. In this manner, the device is configured to prevent any thrombi that develop within region 36 from exiting the region and entering the subject's bloodstream.

For some applications, the device is configured to promote coagulation of blood that is disposed within region 36 between the conduit and the inner wall of the aorta within the longitudinal portion of the aorta in which the device is placed, by substantially reducing blood flow through this region relative to blood flow through this region in the absence of the device. Typically, the material that defines the upstream outer surface, the downstream outer surface and/or the inner surface is configured to prevent any thrombi that develop within the region from exiting the region and entering the subject's bloodstream. For some applications, by promoting the coagulation of blood within the region, the device causes blood entering the region to become coagulated, such that the region becomes filled with coagulated blood within a given time period of the device being placed within the aorta (e.g., within one week, one month, or three months of the device being placed within the aorta), such that the coagulated blood impedes (e.g., blocks) the flow of blood through the region.

For some application, the blood that becomes coagulated within the region is blood that became trapped within the region immediately upon deployment of the device. Alternatively or additionally, blood enters the region subsequent to the device having been deployed, and the blood that subsequently enters the region becomes coagulated. It is noted that, even for such applications, the upstream and downstream surfaces are configured such that, even when the device is first deployed and before coagulated blood has formed inside the region, flow via flow paths other than through the conduit defined by the inner surface of the device is less than 20 percent (e.g., less than 10 percent, or less than 5 percent) of total blood flow through the longitudinal portion of the subject's aorta. For some applications, techniques are applied in order to coagulate blood that is trapped within region 36. For example, coil compaction techniques may be applied in order to cause the blood to coagulate.

Typically, when device 20 is deployed inside the subject's ascending aorta, blood is supplied to the subject's coronary arteries 38 via backflow of blood through conduit 26 during diastole, and/or via blood flowing directly from the aortic valve to the coronary arteries without passing into conduit 26 (not shown). For some applications, a portion of the blood supply to the coronary arteries is provided by antegrade blood flow from the aortic valve to the coronary arteries (e.g., during systole). Typically, most of the blood supply to the coronary arteries is via the backflow of blood through conduit 26 during diastole.

As described hereinabove, at least a portion of conduit 26 diverges in a direction from upstream end 30 of the conduit to downstream end 34 of the conduit. Due to the divergence of the portion of the conduit, the cross-sectional area of the downstream end of the diverging portion of the conduit is greater than the cross-sectional area of the upstream end of the conduit. Typically, the conduit is divergent over more than 50 percent, e.g., more than 75 percent, or more than 90 percent, of the total length of the conduit, (i.e., the diverging portion comprises more than 50 percent, e.g., more than 75 percent, or more than 90 percent, of the total length of the conduit). Further typically, the conduit is divergent over more than 50 percent, e.g., more than 75 percent, or more than 90 percent, of the total length of the device, (i.e., the diverging portion comprises more than 50 percent, e.g., more than 75 percent, or more than 90 percent, of the total length of the device). For some applications, the divergence of the conduit is at a constant angle along the length of the diverging portion of the conduit, for example, such that the diverging portion of the conduit defines a frustoconical shape. For some applications, the angle of the divergence of the conduit along the diverging portion of the conduit changes along the length of the diverging portion of the conduit. For example, the angle of the divergence may increase from the upstream end of the portion to the downstream end of the portion, such that inner surface 24 has a convex cross-section along the diverging portion of the conduit. For some applications, the diverging portion of the conduit defines a Stratford ramp shape. Typically, the upstream and downstream ends of the diverging portion of the conduit define circular cross-sections. Alternatively, the upstream and downstream ends of the diverging portion of the conduit define elliptical cross-sections, polygonal cross-sections, or differently shaped cross-sections.

For some applications, at each of the upstream and downstream ends of the aortic pressure-loss-reduction device, frame 52 of the device defines a folded portion 56U and 56D at the transition between the intermediate portion 23 of the device (which has inner surface 24 that defines conduit 26, and which is defined by an intermediate portion 23F (FIG. 3A) of frame 52) and, respectively, the upstream anchor 33 and the downstream anchor 31. For example, as shown, the frame of the device may form folded portions 56UF and 56DF that have sinusoidal (i.e., S-shaped) cross-sectional shapes.

Typically, due to folded portion 56U, along the longitudinal direction of the device, there is partial overlap between upstream anchor 33, and conduit 26. For some applications (not shown), upstream folded portion 56U is such that the upstream end of conduit 26 extends proximally beyond the upstream end of upstream anchor 33. Typically, the upstream end of upstream anchor 33 is placed within the aorta downstream of the aortic sinuses. For some applications, the upstream end of the conduit extends proximally beyond the upstream end of upstream anchor, such that the upstream end of the conduit is closer to the aortic valve than the upstream end of the upstream anchor. For some applications (not shown), the upstream anchor extends distally such that it overlaps with most of (e.g., all of) conduit 26. Typically, due to folded portion 56D, along the longitudinal direction of the device, there is partial overlap between downstream anchor 31, and conduit 26. For some applications (not shown), downstream folded portion 56D is such that the downstream end of conduit 26 extends distally beyond the downstream end of downstream anchor 31. For some applications (not shown), downstream anchor 31 extends proximally such that it overlaps with most of (e.g., all of) conduit 26.

For some applications, the folded portions enhance sealing between the anchors of the device and the aorta (relative to if the device did not include folding portions, ceteris paribus), by enhancing the radial force that the anchors of the device exert upon the inner wall of the aorta. For example, the folded portions may enhance the radial force since, at the folded portions there are effectively two or more layers applying a radial force to the inner wall of the aorta, and/or due to the shape of the fold itself adding to the outward radial force that is exerted upon the inner wall of the aorta. Moreover, at the folded portions there is typically a portion of frame 52 that extends in the radial direction, or at least extends at an angle that includes a strong radial component. Typically, this portion of the frame enhances the radial force that the anchors of the device exert upon the inner wall of the aorta, in a similar manner to how a spoke of a wheel enhances the radial strength of the wheel.

For some applications, due to the both the upstream and downstream ends of device 20 including folded portions, intermediate portion 23 of the device, which defines conduit 26, is (a) on the one hand, longitudinally fixed with respect to the aorta by the upstream and downstream portion exerting radial forces against the inner wall of the aorta (the radial forces being reinforced by the folded portions), but (b) on the other hand, able to adjust the angle that the longitudinal axis of the intermediate portion makes with the longitudinal axis of the upstream and downstream portions, by the folded portions acting as hinges about which the intermediate portion can flex. In this manner, the intermediate portion of the device is able to adjust its angular position with respect to the aorta, and/or be disposed at an angle with respect to the local longitudinal axis of the aorta at the longitudinal locations at which the upstream and/or downstream portions are fixed to the aorta.

For some applications, by virtue of the intermediate portion being separated from the upstream and downstream portions, the length of the intermediate portion typically does not change even if the distance between the upstream and downstream portion changes (e.g., due to movement of the wall of the aorta). For some applications, frame 52 is configured such that in the event that the diameter of the upstream anchor changes, the diameter of conduit 26 does not change by the same amount, as described in further detail hereinbelow with reference to FIGS. 3A-7C.

Typically, upstream folded portion 56U of frame 52 with material 54 coupled thereto acts as upstream outer surface 28, as described hereinabove, and is configured to impede antegrade and/or retrograde blood flow around the outside of the upstream end of the conduit. Further typically, downstream folded portion 56D of frame 52 with material 54 coupled thereto acts as downstream outer surface 32, as described hereinabove, and is configured to impede antegrade and/or retrograde blood flow around the outside of the downstream end of the conduit. It is noted that folded portion 56D is typically configured such that at any given radial location along the folded portion, there is only one layer of the stent graft material (a layer of stent graft material typically including a frame and covering material, as described hereinabove) impeding blood flow around the outside of the downstream end of the conduit. Similarly, folded portion 56U is typically configured such that at any given radial location along the folded portion, there is only one layer of the stent graft material impeding blood flow around the outside of the upstream end of the conduit.

For some applications, at the downstream end of downstream anchor 31, cells of frame 52 do not have material 54 coupled to them, but rather are open cells (as shown in FIG. 1B, for example). For some such applications, less than 50 percent of the downstream anchor is covered with material 54. For example, between 20 percent and 50 percent (e.g., approximately 25 percent) of the downstream anchor may be covered with material 54. Typically, during deployment of device 20, prior to the upstream anchor being released from its radially-constrained configuration (in which it is typically held by a delivery catheter), at least a portion of the open cells at the downstream end of the downstream anchor are released from the delivery catheter. Subsequently, the upstream anchor is released from its radially-constrained configuration. At this stage, even if the downstream end of the device has not been fully released from the catheter, there is at least some blood flow through the device, the blood being able to exit the downstream end of the device via the open cells at the downstream end of the downstream anchor. The aforementioned procedure is typically performed in accordance with techniques described in WO 19/097424 to Karavany, which is incorporated herein by reference.

Figure 2A:
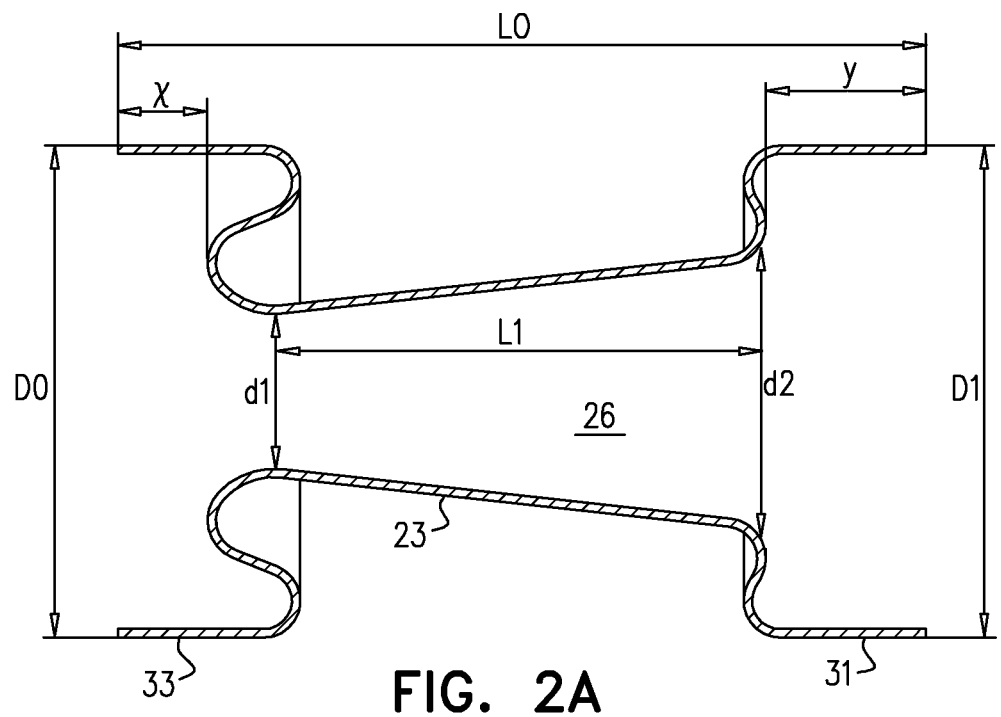
FIGS. 2A, 2B, and 2C are schematic illustrations of a pressure-loss-reduction device for implanting inside a subject's ascending aorta, in accordance with some applications of the present invention.
Figure 2B:
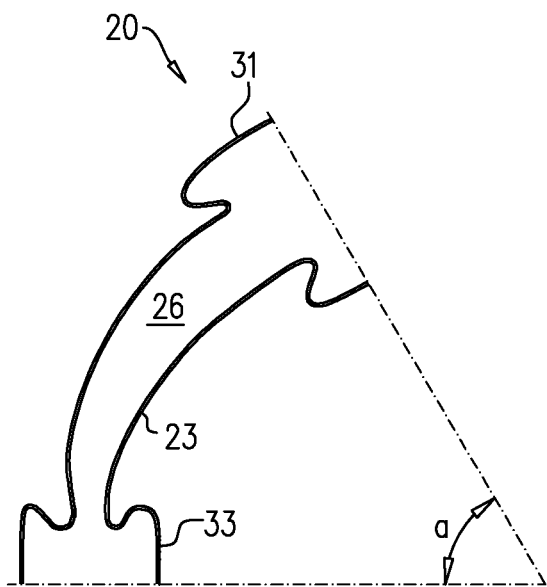
Figure 2C:
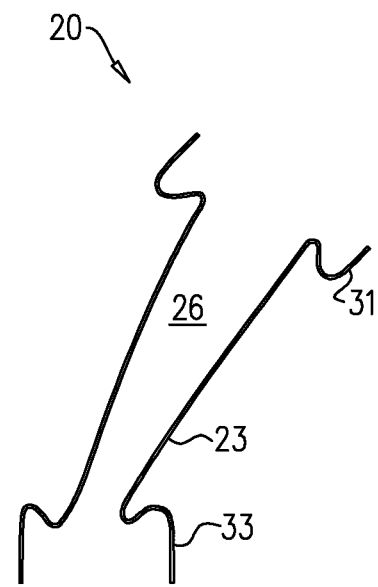

Reference is now made to FIGS. 2A, 2B, and 2C, which are schematic illustrations of pressure-loss-reduction device 20, in accordance with some applications of the present invention. Referring to device 20 as schematically illustrated in FIGS. 2A, 2B, and 2C, device 20 typically has the following dimensions, when in a non-constrained configuration:

A distance x from the upstream end of the upstream anchor to an upstream end of conduit 26 is typically less than 15 mm, e.g. less than 10 mm. For some applications, the upstream end of the conduit extends beyond the upstream end of the upstream anchor by a distance of up to 5 mm.

A distance y from the downstream end of the downstream anchor to a downstream end of conduit 26 is typically less than 30 mm, e.g. less than 15 mm.

A diameter d1 of conduit 26 at an upstream end of the diverging portion is typically more than 10 mm (e.g., more than 12 mm), and/or less than 20 mm (e.g., less than 16 mm), e.g., between 10 and 20 mm, or between 12 and 16 mm.

A diameter d2 of conduit 26 at a downstream end of the diverging portion is typically more than 12 mm (e.g., more than 16 mm), and/or less than 30 mm (e.g., less than 25 mm), e.g., between 12 and 30 mm, or between 16 and 25 mm.

Diameter D0 of upstream anchor 33 is typically more than 20 mm (e.g., more than 23 mm), and/or less than 45 mm (e.g., less than 36 mm), e.g., between 20 and 45 mm, or between 23 and 36 mm.

Diameter D1 of downstream anchor 31 is typically more than 20 mm (e.g., more than 26 mm), and/or less than 48 mm (e.g., less than 42 mm), e.g., between 20 and 48 mm, or between 26 and 42 mm.

An angle a between a plane defined by an upstream end of the upstream anchor and a plane defined by the downstream end of the downstream anchor is between 0 and 120 degrees, or between 30 and 90 degrees.

Typically, a length L0 of pressure-loss-reduction device 20 is greater than 20 mm (e.g., greater than 30 mm), and/or less than 110 mm (e.g., less than 90 mm), e.g., 20-110 mm, or 30-90 mm. For some applications, a length L1 of the diverging portion of conduit 26 (measured along the longitudinal axis of the device) is greater than 20 mm (e.g., greater than 30 mm), and/or less than 70 mm (e.g., less than 60 mm), e.g., 20-70 mm, or 30-60 mm, and length L0 of the device is greater than the length of the diverging portion. As described hereinabove, typically, the conduit is divergent over more than 50 percent, e.g., more than 75 percent, or more than 90 percent of the total length of the conduit (i.e., the diverging portion of the conduit comprises more than 50 percent, e.g., more than 75 percent, or more than 90 percent of the total length of the conduit). Further typically, the conduit is divergent over more than 50 percent, e.g., more than 75 percent, or more than 90 percent of the total length of the device (i.e., the diverging portion of the conduit comprises more than 50 percent, e.g., more than 75 percent, or more than 90 percent of the total length of the conduit).

For some applications, a ratio of (a) outer diameter D0 of upstream anchor 33 to (b) outer diameter D1 of the distal end of downstream anchor 31 is greater than 3:4, and/or less than 4:3, e.g., between 3:4 and 4:3. Outer diameter D0 of the upstream anchor is typically made to conform with the inner diameter of the subject's aorta toward the upstream end of the device, and outer diameter D1 of the downstream anchor is typically made to conform with the inner diameter of the subject's aorta at the downstream end of the device. Since there is some variation in the shapes and sizes of subjects' aortas, the ratio of D0:D1 typically varies between 3:4 and 4:3. Typically, the maximum outer diameter of the device (i.e., the outer diameter of the device at the location along the length of the device at which the outer diameter is at its maximum) is greater than 18 mm (e.g., greater than 25 mm), and/or less than 45 mm (e.g., less than 35 mm), e.g., 18-45 mm, or 25-35 mm.

Further typically, the difference between diameter d1 of conduit 26 at an upstream end of the diverging portion, and diameter d2 of conduit 26 at a downstream end of the diverging portion is greater than 3 mm (e.g., greater than 5 mm, or greater than 10 mm), and/or less than 30 mm (e.g., less than 20 mm), e.g., 5-30 mm, or 10-20 mm. For some applications, the ratio of diameter d2 of conduit 26 at a downstream end of the diverging portion to diameter d1 of conduit 26 at an upstream end of the diverging portion is greater than 4:3 (e.g., greater than 2:1), and/or less than 4:1 (e.g., less than 3:1), e.g., 4:3-4:1, or 2:1-3:1. It is noted that the cross-section of the conduit is not necessarily circular. For applications in which the term "diameter" is used with reference to an object or a portion of an object having a non-circular cross-section, the term "diameter" should be interpreted as meaning the hydraulic diameter, i.e. 4A/P (where A is the cross-sectional area, and P is the perimeter).

For some applications, the ratio of diameter d2 of conduit 26 at a downstream end of the diverging portion to diameter d1 of conduit 26 at an upstream end of the diverging portion is less than 4:3, for example between 5:4 and 7:6 (e.g., 6:5). For some such applications, the difference between diameter d2 and diameter d1 is less than 3 mm, or less than 2 mm. By way of example, d2 may be 14.5 mm and d1 may be 13 mm. It is noted that, even with devices with diameters d2 and d1 as described in the present paragraph, the inventors of the present application have found that some of the beneficial results of placing the device in the aorta of a subject with aortic valve stenosis are likely to be achieved, based upon in vitro experiments that were performed with such devices using a model of the aortic valve and the ascending aorta with a pulse generator. Moreover, the inventors of the present application have found that some of the beneficial results of placing the device in the aorta of a subject with aortic valve stenosis are likely to be achieved even with a device in which conduit 26 does not diverge, but is cylindrical, based upon in vitro experiments that were performed with such devices using a model of the aortic valve and the ascending aorta with a pulse generator. Therefore, the scope of the present invention includes pressure-loss-reduction device 20 that is generally as described herein, but in which conduit 26 does not diverge, but is cylindrical, and methods of use of such a device, mutatis mutandis. For some applications (not shown), rather than the diameter of the diverging portion increasing in a gradual manner, the diameter of the diverging portion increases in a stepwise manner.

For some applications, even in the non-constrained configuration of the device (i.e., in the absence of any external forces being exerted upon the device) intermediate portion 23 of the device (which has inner surface 24 that defines conduit 26) is configured to be curved along the longitudinal axis of the conduit, as shown in FIG. 2B. Alternatively, as shown in FIG. 2C, in the non-constrained configuration of the device, intermediate portion 23 of the device (which has inner surface 24 that defines conduit 26) is configured to be disposed at an angle with respect to upstream anchor 33 (i.e., such that the longitudinal axis of the conduit forms an angle with respect to the longitudinal axis of the upstream anchor), but the conduit is not curved. For some applications, the device as shown in FIG. 2C is configured such that the conduit becomes curved upon being placed in the ascending aorta, such as to conform to the curvature of the ascending aorta.

It is noted that, typically, the dimensions of device 20 described herein are the dimensions that the device is configured to have, when the device is in a non-constrained configuration. Typically, if the device is inserted via a delivery device, the device is constrained during its insertion, such that the dimensions of the device during the insertion may not be as described herein. Further typically, upon being released from the delivery device inside the aorta, device 20 assumes a configuration that is somewhat constrained by the aorta. For some applications, device 20 is configured such that in its non-constrained configuration at least a portion of the conduit 26 diverges, but the conduit 26 is not curved, as shown in FIG. 1B. For some such applications, conduit 26 of device 20 is configured to become curved upon being deployed in the aorta, by virtue of forces exerted upon the device by the inner wall of the aorta. Typically, intermediate portion 23F of the frame (corresponding to intermediate portion 23 of the device) is configured to be flexible in order to facilitate curving of the intermediate portion of the device upon being placed inside the aorta, e.g., using techniques as described herein.

It is noted that upon being deployed in the ascending aorta, the aortic pressure-loss-reduction device typically only undergoes changes in shape in a passive manner (e.g., due to changes in shape of portions of the subject's body, such as the aorta). Upon being deployed in the ascending aorta, the shape of the aortic pressure-loss-reduction device is typically not changed in an active manner.

For some applications, pressure-loss-reduction device 20 is implanted in a non-minimally-invasive manner (e.g., using traditional surgical techniques). For some such applications, even during the insertion of the device, the device is configured in its non-constrained configuration.

As described hereinabove, typically, pressure-loss-reduction device 20 is made of graft material, which is typically formed from a combination of frame 52, which is typically a metal or alloy frame (e.g., a stent made of stainless steel or nitinol or cobalt chromium), and covering material 54, e.g., a fabric and/or a polymer (such as expanded polytetrafluoroethylene (ePTFE), or woven, knitted and/or braided polyester), which is typically coupled to the frame via stitching, spray coating, encapsulation, electrospinning, dip molding and/or a different technique. Typically, the covering material covers the inside of at least a portion of frame 52, such that blood flowing through the device contacts the material. Alternatively or additionally, the covering material is disposed outside at least a portion of the frame, for example, in order to facilitate retraction of the device back into a delivery device. For example, a first layer of covering material may be disposed inside the frame, and a second layer of the material may be disposed outside the frame. For some applications, at least a portion of the frame is embedded by the material.

Figure 3A:
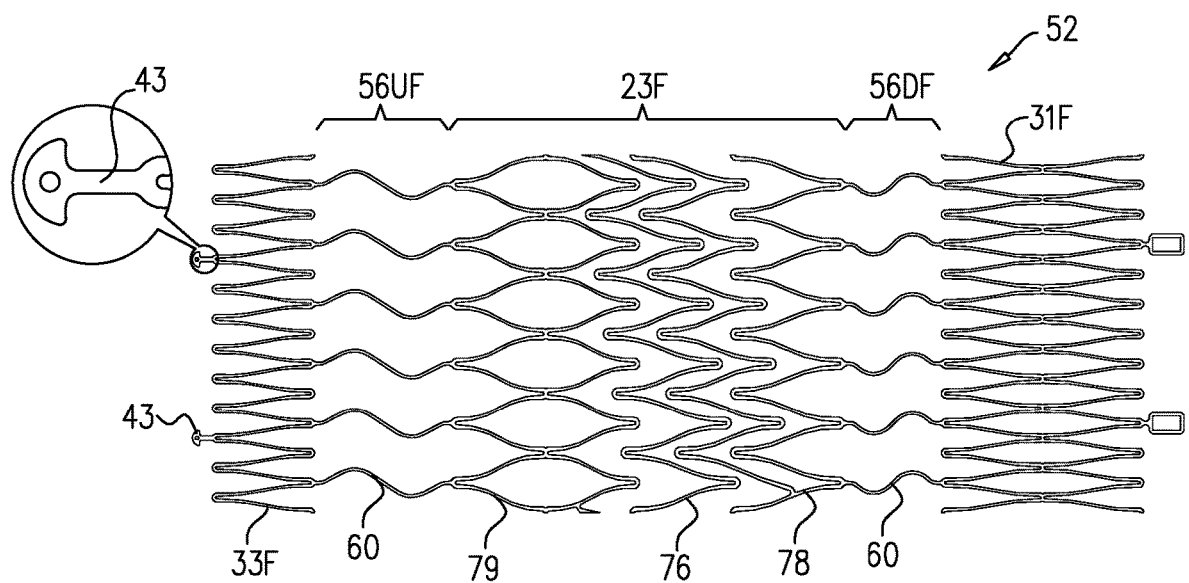
FIGS. 3A, 3B and 3C are schematic illustrations of frames of a pressure-loss-reduction device configured such that, in the event that the diameter of an upstream anchor portion of the device changes, the diameter of the upstream end of a conduit of the device does not change by the same amount, in accordance with some applications of the present invention.
Figure 3B:
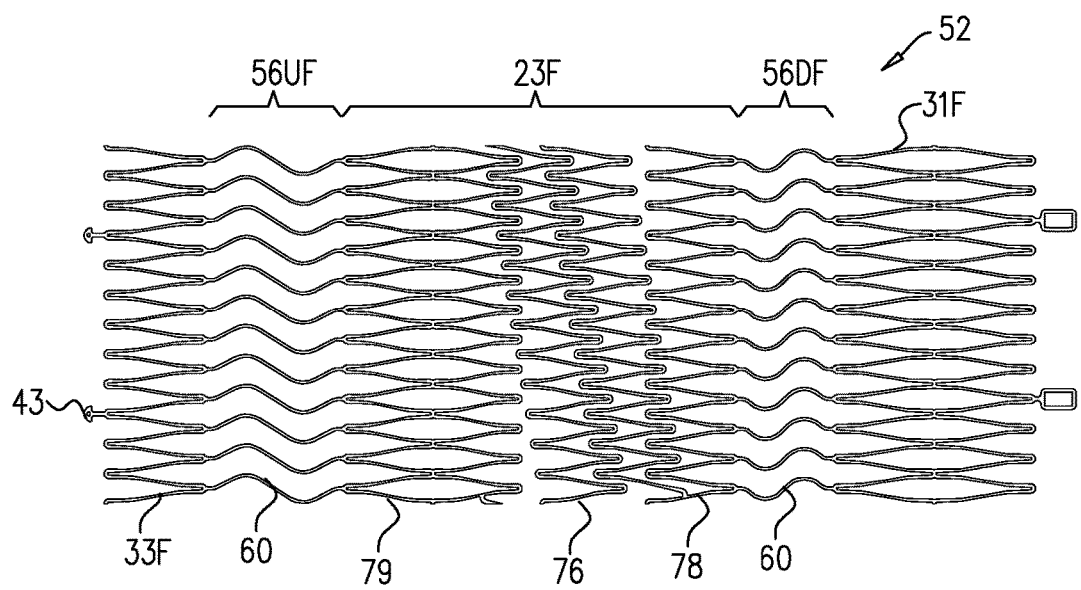
Figure 3C:
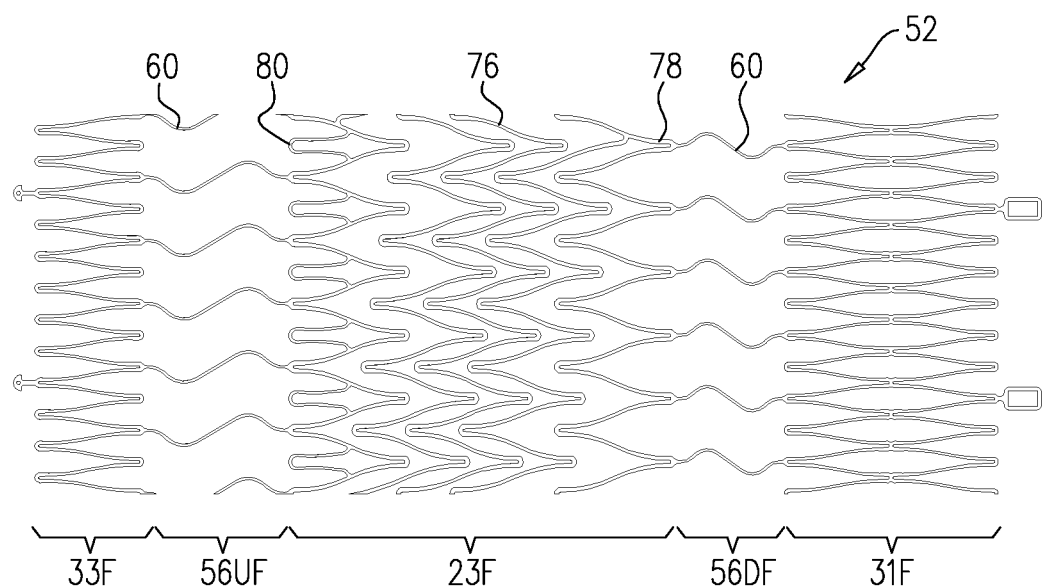

Reference is now made to FIGS. 3A, 3B, and 3C, which are schematic illustrations of frames 52 of a pressure-loss-reduction device 20 configured such that in the event that the diameter of upstream anchor 33 of the device changes, the diameter of the upstream end 30 of conduit 26 of the device does not change by the same amount, in accordance with some applications of the present invention. Each of FIGS. 3A-3C shows a flattened profile of the device frame, in accordance with some applications of the present invention. As described hereinabove, for some applications, device 20 is formed from a single continuous portion of graft material. The graft material is typically formed from a combination of frame 52, which is typically a metal or alloy frame (e.g., a stent made of stainless steel or nitinol or cobalt chromium), and covering material 54, e.g., a fabric and/or a polymer (such as expanded polytetrafluoroethylene (ePTFE), or woven, knitted and/or braided polyester), which is typically coupled to the inside of the frame via stitching, spray coating, encapsulation, electrospinning, dip molding and/or a different technique. In accordance with some applications, a layer of the material is coupled to the inside of at least a portion of the frame, the outside of at least a portion of the frame, and/or at least a portion of the frame is embedded within a layer of the material. The profiles shown in FIGS. 3A-C depict (for illustrative purposes) how the frame of the device would appear if, prior to shape setting the frame, a longitudinal incision was to be made along the length of the frame at a given circumferential location of the frame, and the frame were to then be laid out flat upon a surface.

As shown in each of FIGS. 3A-C, the frame typically comprises an upstream anchor frame portion 33F (corresponding to upstream anchor 33), a downstream anchor frame portion 31F (corresponding to downstream anchor 31), and intermediate frame portion 23F (corresponding to the intermediate portion of the device, inner surface 24 of which defines conduit 26). Typically, at frame portion 56UF and 56DF corresponding to folded portions 56U and 56D (i.e., between upstream anchor frame portion 33F and intermediate frame portion 23F, and between downstream anchor frame portion 31F and intermediate frame portion 23F), the frame defines sinusoidal struts 60. Typically, the folded portions are formed by shape setting the sinusoidal struts into the desired folded shape. For some applications, the sinusoidal struts facilitate shape setting the frame of device 20 to include folded portion 56U and 56D, such that the radius of curvature of the curve made by the folded portion is smaller than if the folded portion were to be formed solely by shape setting a straight strut. For some applications, the folded portion can thereby be longer. For some applications, allowing upstream folded portion 56U to be longer facilitates placement of the upstream end of the conduit closer to the orifice of the aortic valve, by allowing greater overlap between the conduit and the upstream anchor.

As indicated in FIGS. 3A-C, typically sinusoidal struts 60 at frame portion 56UF corresponding to the upstream folded portion 56U are longer than those at frame portion 56DF corresponding to downstream folded portion 56D. For example, the ratio of the lengths of the sinusoidal struts corresponding to the upstream folded portion 56U to lengths of the sinusoidal struts corresponding to downstream folded portion 56D may be more than 5:4, or more than 3:2, or more than 2:1. Referring again to FIG. 1B, the difference between the diameter of the conduit at the upstream end and the diameter of the upstream anchor, is greater than the difference between the diameter of the conduit at the upstream end and the diameter of the upstream anchor. Therefore, the struts corresponding to the upstream folded portion are longer than those corresponding to the downstream portion. Furthermore, as described hereinabove, it is typically desirable for the upstream end of the conduit to overlap with the upstream anchor, such that the upstream end of the conduit is placed as close as possible to the orifice of the aortic valve. For some applications, the sinusoidal struts corresponding to the upstream folded portion are configured to have a length that is such as to facilitate the requisite degree of overlap between the conduit and the upstream anchor.

Intermediate portion 23F of the frame that corresponds to intermediate portion 23 of pressure-reduction-loss device 20 (i.e., the portion of the device that defines conduit 26) is typically configured to provide the characteristics described hereinabove. Namely, that (a) least a portion of the conduit diverges in a direction from an upstream end of the conduit to a downstream end of the conduit, such that the cross-sectional area of the conduit at the downstream end is greater than the cross-sectional area of the conduit at the upstream end, and (b) at least upon being placed inside the subject's ascending aorta, the conduit is curved (i.e., the conduit defines a curved longitudinal axis), such as to conform at least partially to the curvature of the ascending aorta. For some applications, device 20 is configured to curve, such as to conform with curvature of the ascending aorta, at least partially by virtue of intermediate portion 23F of frame 52 (i.e., the portion of the frame that corresponds to intermediate portion 23 of pressure-loss-reduction device 20) including a spiraling set of struts 76. For example, as shown, intermediate frame portion 23F may define a zigzag strut configuration that spirals around the portion of the frame that corresponds to intermediate portion 23 of the device. Typically, along the spiraling set of struts, each row of struts in the spiral is not connected to adjacent rows of the spiral, such that each row of struts is able to flex with respect to the adjacent row.

Typically, device 20 is configured to curve, such as to conform with curvature of the ascending aorta, at least partially by virtue of intermediate portion 23F of frame 52 (i.e., the portion of the frame that corresponds to intermediate portion 23 of pressure-loss-reduction device 20) including a spiraling set of struts 76. For example, as shown, intermediate portion 23F may define a zigzag strut configuration that spirals around the portion of the frame that corresponds to intermediate portion 23 of the device. For some applications, alternative or additional techniques are used to provide the intermediate portion of the device with flexibility, e.g., as described in WO 19/097424 to Karavany, which is incorporated herein by reference. For some applications, at the downstream end of intermediate portion 23F of the frame (i.e., at the location that is adjacent to sinusoidal struts corresponding to folded portion 56D), the frame includes a complete row 78 of struts. For some applications, at the upstream end of intermediate portion 23F of the frame (i.e., at the location that is adjacent to sinusoidal struts corresponding to folded portion 56U), the frame includes a complete row 79 of closed cells, e.g., as shown in FIGS. 3A-B.

It is typically desirable that the diameter of upstream end 30 of conduit 26 does not change substantially, since the diameter of the upstream end of the conduit is typically sized to correspond to the orifice of the subject's aortic valve. However, the upstream anchor typically undergoes variations in its diameter, for example, due to variations in pressure that is exerted upon the upstream anchor over the course of the subject's cardiac cycle. Therefore, for some applications, at the upstream end of intermediate portion 23F of the frame, the frame is reinforced relative to at least some of the rest of intermediate portion 23F (e.g. relative to a longitudinally-central portion of the intermediate portion). For example, as shown in FIGS. 3A and 3B, the frame may include a complete row 79 of closed cells at the upstream end of intermediate portion 23F of the frame. In this manner, the diameter of the upstream end of the conduit is stabilized and less susceptible to changes.

Experiments were conducted by the inventors of the present application, in which they measured the ratio between the change of diameter that the upstream end of the device underwent in response to changes in the diameter of the upstream anchor. It was found that when using a device as shown in FIGS. 3A-B in which the upstream anchor had an initial diameter of 30 mm and the upstream end of the conduit has an initial diameter of 14.5 mm, then in response to the diameter of the upstream anchor being reduced by 5 mm (to 25 mm), the diameter of the upstream end of the conduit decreased by less than 2 mm, and in some cases as little as 1.5 mm. Thus, in accordance with some applications of the present invention, the upstream end of intermediate portion 23F of the frame is reinforced, such that, a ratio of the decrease in the absolute diameter of the upstream end of the intermediate portion of the frame (which defines the upstream end of conduit 26) to the decrease in the absolute diameter of the upstream anchor portion is less than 1:2, e.g., less than 1:3, less than 1:4, or less than 1:5.

For some applications, alternative or additional techniques to those shown in FIGS. 3A and 3B are used to reinforce the upstream end of intermediate portion 23F of the frame, relative to at least some of the rest of intermediate portion 23F (e.g. relative to a longitudinally-central portion of the intermediate portion). For example, struts that are shorter and/or wider than those used in the rest of intermediate portion 23F may be used at the upstream end of intermediate portion 23F. Alternatively or additionally, a greater number of cells and/or struts may be used in the upstream-most row (or the first number of upstream-most rows) of intermediate portion 23F, than are used in other rows of intermediate portion 23F. For some applications, one or more of the above-described techniques for reinforcing the upstream end of intermediate portion 23F of the frame, relative to at least some of the rest of intermediate portion 23F (e.g. relative to a longitudinally-central portion of the intermediate portion) is combined with the techniques described hereinbelow with reference to FIGS. 4-7C.

Referring to FIG. 3C, for some applications, intermediate portion 23F of the frame has a zigzag strut configuration that spirals around the portion of the frame that corresponds to intermediate portion 23 of the device. For some applications, at the upstream end of intermediate portion 23F of the frame (i.e., at the location that is adjacent to sinusoidal struts corresponding to folded portion 56U), the frame includes supporting struts 80 that are disposed between pairs of struts that are in the first row of the spiral. For example, as shown, the supporting struts may be generally v-shaped or u-shaped and may face in the opposite direction to a v-shape or a u-shape defined by the pairs of struts of the struts that are in the first row of the spiral. The supporting struts reinforce the upstream end of intermediate portion 23F of the frame, relative to at least some of the rest of intermediate portion 23F (e.g. relative to a longitudinally-central portion of the intermediate portion). For some applications, the above-described technique for reinforcing the upstream end of intermediate portion 23F of the frame, relative to at least some of the rest of intermediate portion 23F (e.g. relative to a longitudinally-central portion of the intermediate portion) is combined with the techniques described hereinbelow with reference to FIGS. 4-7C.

For some applications, the flexibility of the sinusoidal struts 60 in portion 56UF of the frame is configured such that the decrease in the absolute diameter of the upstream end of intermediate portion 23F of the frame (which defines the upstream end of conduit 26) in response to a decrease in the absolute diameter of the upstream anchor portion is less than the decrease in the absolute diameter of the upstream anchor portion. That is to say that the sinusoidal struts are made to be flexible such that they absorb at least some of the change in the diameter of the upstream anchor portion, without conveying the entire change in the diameter to the upstream end of the conduit. It is noted that, typically, by increasing the flexibility of the sinusoidal struts, the radial force that the anchor exerts on the inner wall of the aorta is decreased. As such, by using the flexibility of the sinusoidal struts to stabilize the diameter of the upstream end of the conduit, there is a tradeoff between the stabilization of the diameter of the upstream end of the conduit, and the radial force that the anchor is able to exert on the inner wall of the aorta. By contrast, reinforcing the upstream end of intermediate portion 23F of the frame as described hereinabove typically results in the diameter of the upstream end of the conduit being stabilized as well as the radial force that the anchor exerts on the inner wall of the aorta being increased. Therefore, for some applications, the diameter of the upstream end of the conduit is stabilized by reinforcing the upstream end of intermediate portion 23F of the frame, as described hereinabove.

For some applications, angled struts (e.g., angled struts 150 described hereinbelow with reference to FIGS. 4-7C) are disposed between upstream anchor portion 33F of the frame corresponding to upstream anchor 33 and the upstream end of intermediate portion 23F of the frame corresponding to intermediate portion 23 of the device. Typically, the angled struts are configured such that, in the event that the diameter of upstream anchor 33 of the device changes, the diameter of the upstream end 30 of conduit 26 of the device does not change by the same amount, as described in further detail hereinbelow. For example, the angled struts may be configured such that, in the event that the diameter of upstream anchor 33 of the device decreases, the diameter of the upstream end 30 of conduit 26 of the device decreases by a smaller absolute amount than the absolute decrease in the diameter of the upstream anchor. Or, the angled struts may be configured such that, in the event that the diameter of upstream anchor 33 of the device decreases, the diameter of the upstream end 30 of conduit 26 of the device increases.

For some applications, device 20 includes one or more projections 43 that project from an upstream end of portion 33F of frame 52 (which corresponds to upstream anchor 33. The projections are typically used to maintain the upstream anchor in a radially-constrained configuration even after the intermediate portion has been released into a non-radially-constrained configuration, e.g., as described with reference to FIGS. 4A-5D of WO 19/0097424 to Karavany, which is incorporated herein by reference.

Figure 4:
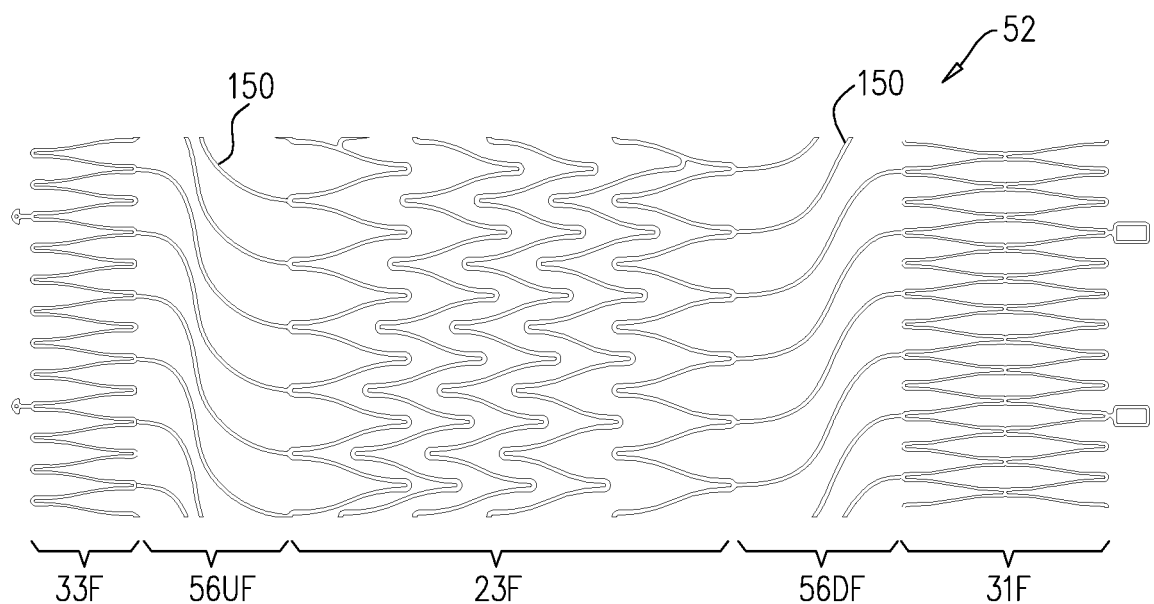
FIG. 4 is a schematic illustration of a frame of a pressure-loss-reduction device for implanting inside a subject's aorta, the frame including a plurality of angled struts that are configured to facilitate folding of a folded portion of the frame, in accordance with some applications of the present invention.

Reference is now made to FIG. 4, which is a schematic illustration of frame 52 of pressure-loss-reduction device 20 for implanting inside a subject's aorta, the frame including a plurality of angled struts 150 that are configured to facilitate folding of folded portion 56UF and/or 56DF of the frame, in accordance with some applications of the present invention. FIG. 4 shows (for illustrative purposes) a flattened profile of the frame, which depicts how the frame of the device would appear if, prior to shape setting the frame, a longitudinal incision was to be made along the length of the frame at a given circumferential location of the frame, and the frame were to then be laid out flat upon a surface. As shown, for some applications, at portion 56UF of the frame (corresponding to folded portion 56U of device 20), the frame defines a plurality of struts 150, which are disposed parallel to each other, and at an angle with respect to the length of the frame. As shown, for some applications, the frame also defines a plurality of struts 150, which are disposed parallel to each other, and at an angle with respect to the length of the frame, at portion 56UD of the frame (corresponding to folded portion 56D of device 20). For some applications, angled struts 150 are straight. Alternatively, the angled struts are curved, as shown. For example, the angled struts may define a sinusoidal curvature. For such applications, angled struts are still angled with respect to the length of the frame, in that a first end of each of the struts (which is coupled to intermediate portion 23F of the frame) is not axially aligned with the second end of the strut (which is coupled to the upstream anchor portion or the downstream anchor portion of the frame). The angled struts are typically configured such that, when pressure-loss-reduction device 20 is disposed in a non-radially-constrained configuration, the struts define a circumferential curvature with respect to the longitudinal axis of the device.

It is noted that the scope of the present invention includes a pressure-loss-reduction device that includes angled struts (as described herein) at only one of either the upstream folded portion or the downstream folded portion of the frame of the device, and not at the other one. Alternatively, the device includes angled struts at both of the upstream and the downstream folded portions of the frame, as shown.

Typically, the folded portions are formed by shape setting. Further typically, the angled struts are curved (e.g., with a sinusoidal curvature). As described hereinabove, for some applications, the curvature of the struts facilitate shape setting the frame of device 20 to include folded portions 56U and 56D, such that the radii of curvature of the curve made by the folded portions are smaller than if the folded portions were to be formed solely by shape setting a straight strut. For some applications, the folded portions can thereby be longer. For some applications, allowing upstream folded portion 56U to be longer facilitates placement of the upstream end of the conduit closer to the orifice of the aortic valve, by allowing greater overlap between the conduit and the upstream anchor.

Figure 5A:
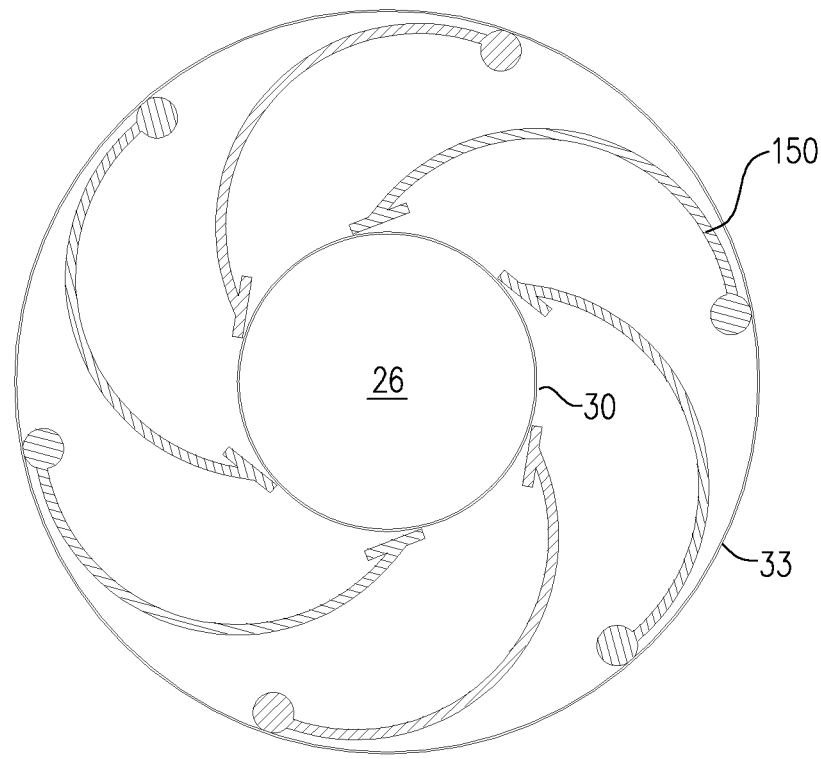
FIGS. 5A and 5B are schematic illustrations of a view of the upstream end of a pressure-loss-reduction device, the frame of the pressure-loss reduction device being as described with reference to FIG. 4, when an upstream anchor portion of the device is respectively at a greater diameter (FIG. 5A) and at a smaller diameter (FIG. 5B), in accordance with some applications of the present invention.
Figure 5B:
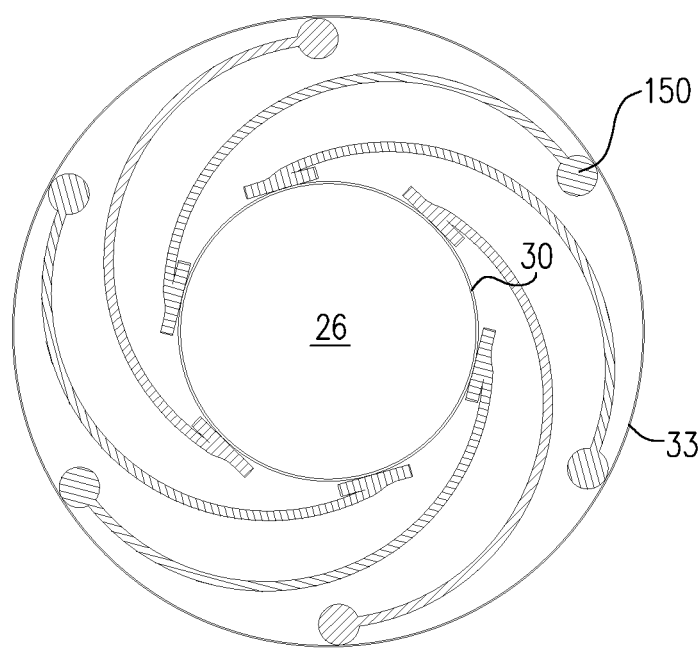
Figure 6A:
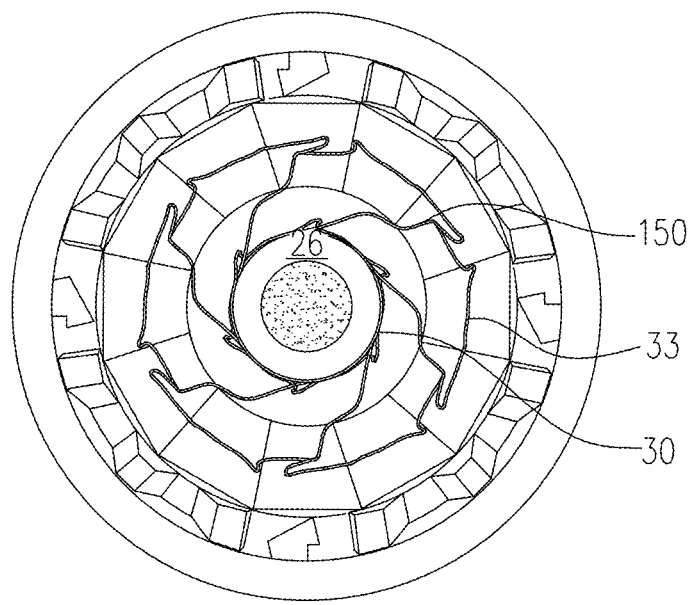
FIGS. 6A and 6B are line drawings based upon photographs of a view of the upstream end of a pressure-loss-reduction device, the frame of the pressure-loss reduction device being as described with reference to FIG. 4, when an upstream anchor portion of the device is respectively at a greater diameter (FIG. 6A) and at a smaller diameter (FIG. 6B), in accordance with some applications of the present invention.
Figure 6B:
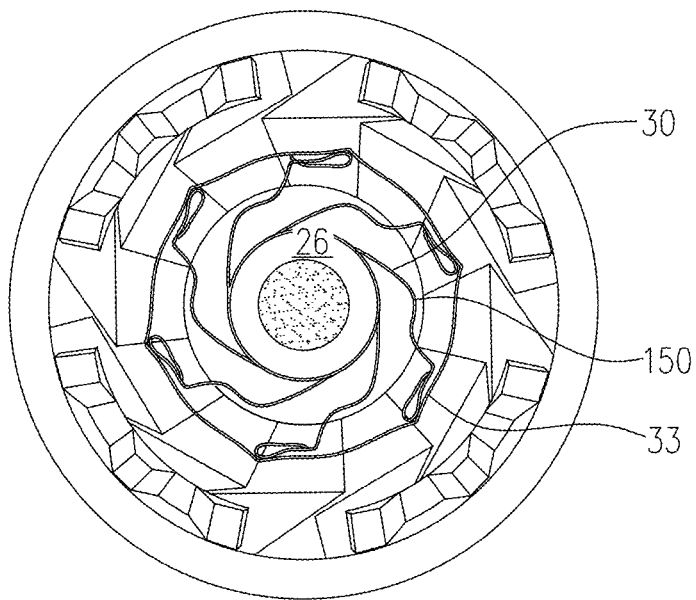

Reference is now made to FIGS. 5A and 5B, which are schematic illustrations of a view of the upstream end of pressure-loss-reduction device 20, the frame of the pressure-loss reduction device being as described with reference to FIG. 4, when upstream anchor 33 of the device is respectively at a greater diameter (FIG. 5A) and at a smaller diameter (FIG. 5B), in accordance with some applications of the present invention. Reference is also made to FIGS. 6A and 6B, which are line drawings based upon photographs of a view of the upstream end of pressure-loss-reduction device 20, the frame of the pressure-loss reduction device being as described with reference to FIG. 4, when upstream anchor 33 of the device is respectively at a greater diameter (FIG. 6A) and at a smaller diameter (FIG. 6B), in accordance with some applications of the present invention.

As described above, it is typically desirable that the diameter of upstream end 30 of conduit 26 (which is defined by the upstream end of the intermediate portion of the frame) does not change substantially, since the diameter of the upstream end of the conduit is typically sized to correspond to the orifice of the subject's aortic valve. However, the upstream anchor typically undergoes variations in its diameter, for example, due to variations in pressure that is exerted upon the upstream anchor over the course of the subject's cardiac cycle. For some applications, angled struts 150 are configured such that in the event that the diameter of upstream anchor portion of the frame (which defines upstream anchor 33) of the device changes, the diameter of the upstream end of the intermediate portion of the frame (which defines the upstream end of conduit 26) of the device does not change by the same amount, as indicated in the transition between FIGS. 5A and 5B, and between FIGS. 6A and 6B.

Figure 7A:
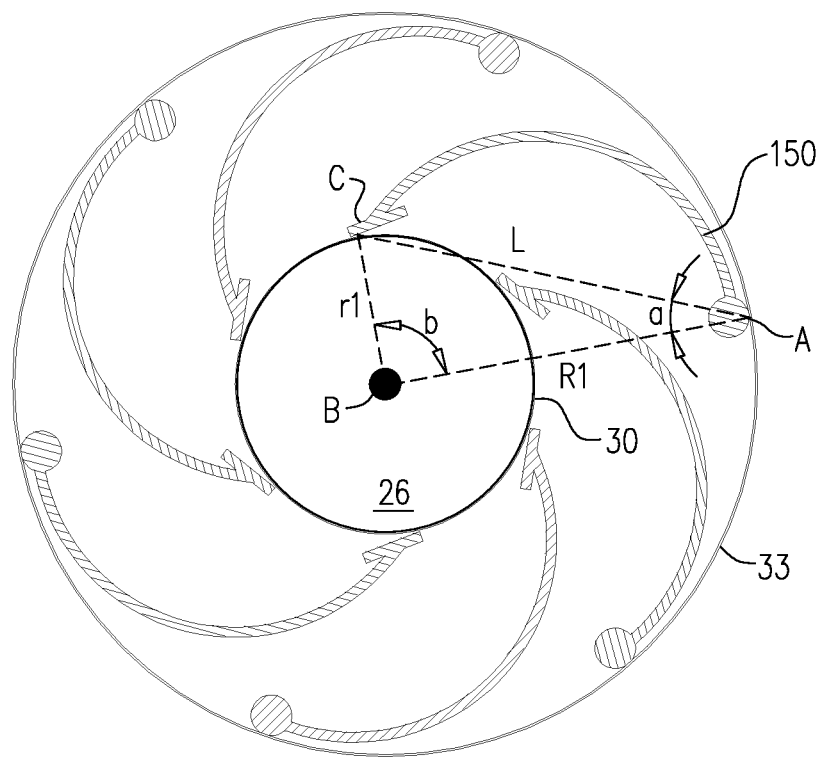
FIGS. 7A and 7B are further schematic illustrations of a view of the upstream end of a pressure-loss-reduction device, the frame of the pressure-loss reduction device being as described with reference to FIG. 4, when an upstream anchor portion of the device is respectively at a greater diameter (FIG. 7A) and at a smaller diameter (FIG. 7B), in accordance with some applications of the present invention.
Figure 7B:
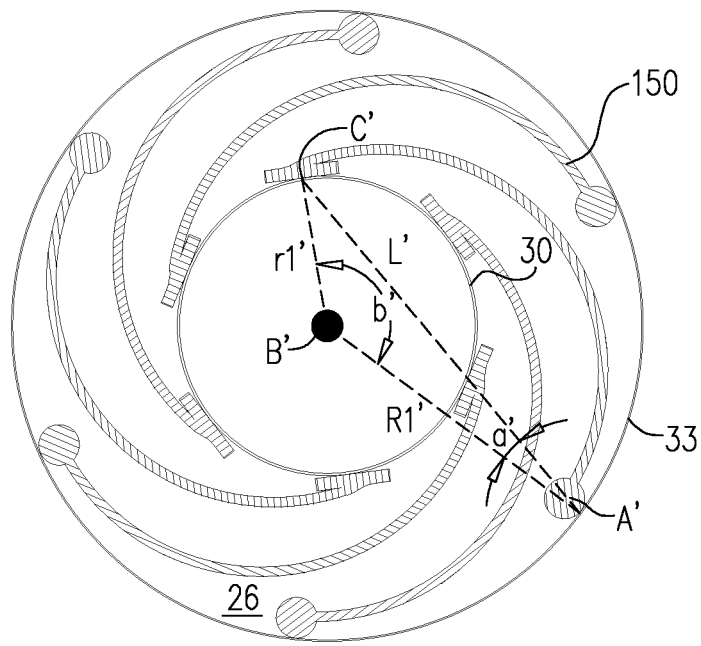
Figure 7C:
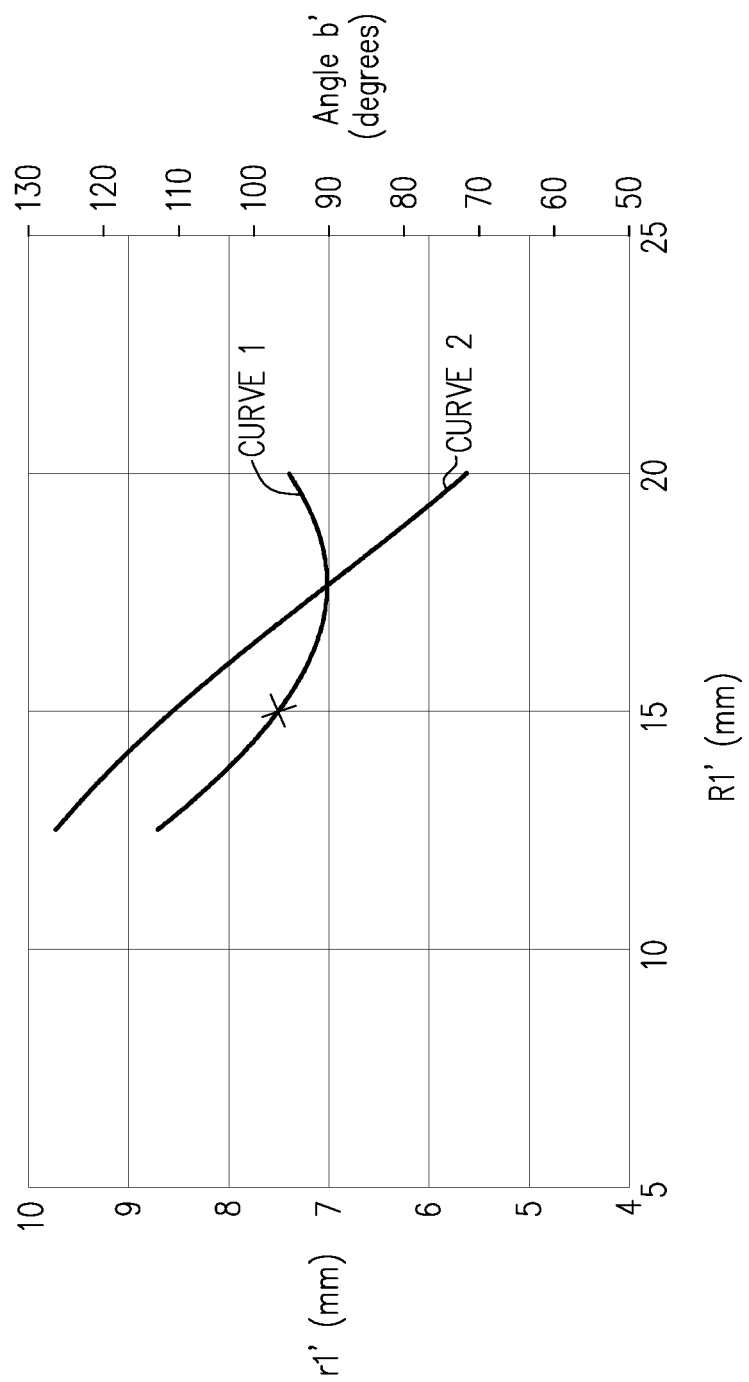
FIG. 7C is a graph indicating the change in the radius of an upstream end of a conduit of a pressure-loss-reduction device, the frame of the pressure-loss reduction device being as described with reference to FIG. 4, as the diameter of the upstream anchor portion of the device changes, in accordance with some applications of the present invention.

Reference is now made to FIGS. 7A, and 7B, which are further schematic illustrations of a view of the upstream end of pressure-loss-reduction device 20, the frame of the pressure-loss reduction device being as described with reference to FIG. 4, when upstream anchor 33 of the device is respectively at a greater diameter (FIG. 7A) and at a smaller diameter (FIG. 7B), in accordance with some applications of the present invention. The schematic illustrations shown in FIGS. 7A and 7B are generally similar to those shown in FIGS. 5A and 5B, but FIGS. 7A and 7B include dimensions and locations marked thereon, for the purpose of the following explanation. Reference is also made to FIG. 7C, which is a graph indicating the change in the radius of the upstream end 30 of conduit 26 of device 20, as the diameter of the upstream anchor changes, as well as showing a change in an angle b defined by the angled struts of the frame of the device, as the diameter of the upstream anchor changes. The dimensions and locations shown in FIGS. 7A-B are defined as follows:

A—This is the location of the end of angled strut 150 at which the angled strut is connected to upstream anchor 33.

B—This is the location of the longitudinal axis of the device at a plane in which the connections between the angled struts and the upstream anchor are located.

C—This is the projection of the end of the angled strut that is coupled to the upstream end 30 of the conduit 26 in the plane in which the connections between the angled struts and the upstream anchor are located.

L—This is the length of line AC between point A and point C.

r1—This is the radius of the upstream end 30 of conduit 26. This is equivalent to the length of a line BC between point B and point C, which is the length between the projection of the end of the angled strut that is coupled to the upstream end 30 of the conduit 26, and the longitudinal axis of the device in the plane in which the connections between the angled struts and the upstream anchor are located.

R1—This is the radius of the upstream anchor 33 (which typically corresponds to the radius of the location of the aorta at which the upstream anchor is deployed, when the device is deployed inside the aorta). This is equivalent to the length of line BA between point B and point A, which is the length between the end of angled strut 150 at which the angled strut is connected to upstream anchor 33 and the longitudinal axis of the device in the plane in which the connections between the angled struts and the upstream anchor are located.

b—This is the angle between line BC and line BA.

a—This is the angle between line AC and line BA.

The dimensions and locations shown in FIG. 7B are the same as those in FIG. 7A, but for after the upstream anchor 33 has been compressed to a smaller diameter. The modified dimensions and locations are indicated by the addition of a "prime" symbol after each of the dimensions and location.

Typically, due to structural rigidity of struts 150, angle a and length L are substantially maintained as the device changes from the shape shown in FIG. 7A to that shown in FIG. 7B (i.e., as the diameter of the upstream anchor decreases). For some applications, in response to the diameter of the upstream anchor portion decreasing, struts 150 are configured such that the circumferential curvature of the struts with respect to longitudinal axis of the frame increases (as shown in the transition from FIG. 7A to FIG. 7B). By virtue of the increase in the circumferential curvature of the struts with respect to longitudinal axis of the frame, the difference between the diameter of the upstream end of the intermediate portion of the frame (which defines the upstream end of conduit 26) and the diameter of the upstream anchor portion decreases, such that the change in the diameter of upstream end of the intermediate portion of the frame (which defines the upstream end of conduit 26) is less than the decrease in diameter of the upstream anchor portion. A mathematical analysis of the above described response of struts 150 to changes in the diameter of the upstream anchor follows.

Referring to FIG. 7A, the following two equation hold:

$$\triangle ABC: L^2 = R1^2 + r1^2 - 2 \times R1 \times r1 \times \cos(b) \quad [\text{equation 1}]$$

$$\frac{L}{\sin(b)} = \frac{r1}{\sin(a)} \quad [\text{equation 2}]$$

Assuming that, due to structural rigidity, angle a and length L are maintained as the device changes from the shape shown in FIG. 7A to that shown in FIG. 7B, then the following equations hold:

$$\triangle A'BC': r'^2 = R'^2 + L^2 - 2 \times R' \times L \times \cos(a) \quad [\text{equation 3}]$$

$$\frac{L}{\sin(b')} = \frac{r'}{\sin(a)} \quad [\text{equation 4}]$$

Solving the equations 1-4 yields the following equation:

$$r' = \frac{}{\sqrt{L^2 + R'^2 - 2 \times L \times R' \sqrt{1 - \frac{r1^2}{L^2}\left[1 - \left(\frac{R1^2 + r1^2 - L^2}{2 \times r1 \times R1}\right)^2\right]}}} \quad [\text{equation 5}]$$

Assuming an initial radius of the upstream anchor (i.e., R1) of 15 mm, an initial radius of the upstream end 30 of conduit 26 (i.e., r1) of 7.5 mm, a length of the angled struts (L, as defined above) of 19 mm, and an initial angle b of 110 degrees, then the relationship between R1' and r1' is as shown in curve 1 in FIG. 7C. The initial radii R1 and r1 are indicated by the cross on the graph. As shown, as the radius R1 (i.e., the radius of the upstream anchor) decreases from the initial radius, radius r1' (i.e., the radius of upstream end 30 of conduit 26) actually increases. As radius R1' increases, radius r1' initially decreases, until R1 reaches approximately 17.5 mm and angle b' decreases to 90 degrees. From below an angle b' of less than 90 degrees, as radius R1' increases there is an increase in radius r1', and as radius R1' decreases, there is a decrease in radius r1'. However, the increase in r1' is less than that of R1'. For example, as radius R1' increases from 17.5 mm to 20 mm, radius r1' only undergoes an increase from 7 mm to approximately 7.4 mm. It is noted that when angle b' is exactly 90 degrees, a change in radius R1 causes no change in radius r1.

In accordance with the above, angle b of angled struts 150 (angle b being as described above) is typically set such that in the absence of any forces acting upon device 20 (i.e., in the non-radially constrained configuration of the device), angle b is more than 45 degrees (e.g., more than 60 degrees), and/or less than 150 degrees (e.g., less than 110 degrees, or less than 90 degrees), e.g., 45-150 degrees, 60-110 degrees, and/or 60-90 degrees).

As described hereinabove, for an angle b of more than 90 degrees, as radius R1' decreases, radius r1' increases. For some applications, an increase in r1' is prevented and/or limited by covering material 54. For such applications, covering material is non-elastic and is sized such as to prevent r1' from increasing above a threshold value. In this manner, variations in the diameter of the upstream end of the conduit 26 may be limited such that the variation is within a given range of diameters, or variations in the diameter of the upstream end of the conduit 26 may be prevented.

For some applications, the techniques described herein for separating between the change in diameter of an anchor and the change in the diameter of an inner conduit of the device are applied to devices other than pressure-loss-reduction device 20, mutatis mutandis. For some applications, the techniques described herein are applied such that, for a given absolute change in the diameter of the anchor, there is a smaller absolute change in the diameter of the conduit. Alternatively, the techniques described herein may be applied such that when there is an increase in the diameter of the anchor, there is a decrease in the diameter of the conduit, and vice versa.

As shown in FIG. 4, for some applications, angled struts 150 are used in downstream folded portion 56DF of the frame, in addition to being used in upstream folded portion 56DF of the frame. Typically, the downstream set of angled struts function in a generally similar manner (with respect to the downstream anchor portion of the frame and the downstream end of the intermediate portion of the frame) to that described hereinabove with reference to the function of the upstream set of angled struts (with respect to the upstream anchor portion and the upstream end of the intermediate portion of the frame).

Typically, as diameter R1' (of the upstream anchor) decreases this generates a torque at the upstream end 30 of conduit 26. Typically, the respective sets of upstream and downstream angled struts are configured such that torque that is generated at a first end of the frame is at least partially cancelled by torque generated at the opposite end of the frame. That is to say that, angled struts 150 that are used in downstream folded portion 56DF of the frame are configured such that, in response to diameters of both the upstream and the downstream anchor portions decreasing, torque that is generated at the upstream end of the intermediate portion (by the first set of angled struts), is at least partially cancelled by torque generated at the downstream end of the intermediate portion (by the second set of angled struts). Typically, the aforementioned functionality is achieved by the directions of the circumferential curvature of the two sets of angled struts (when the frame is in its non-radially constrained configured) being the same as each other (i.e., they both define a clockwise circumferential curvature, or they both define a counterclockwise circumferential curvature).

Figure 8A:
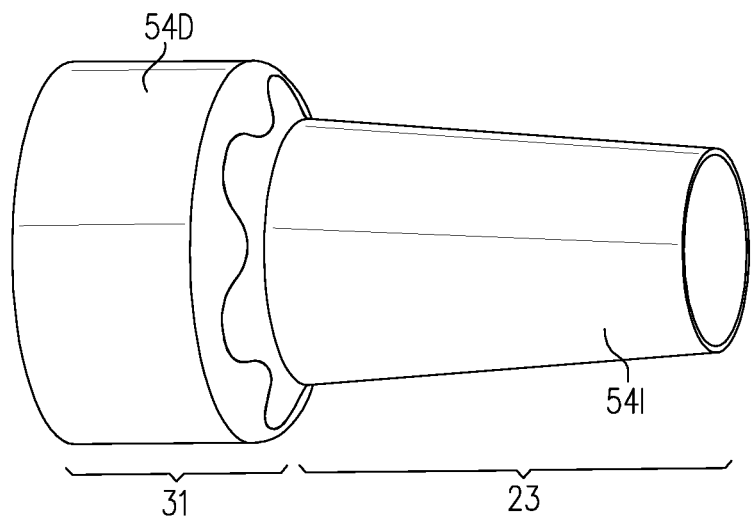
FIG. 8A is a schematic illustration of an intermediate portion and a downstream anchor portion of a pressure-loss-reduction device, in accordance with some applications of the present invention.
Figure 8B:
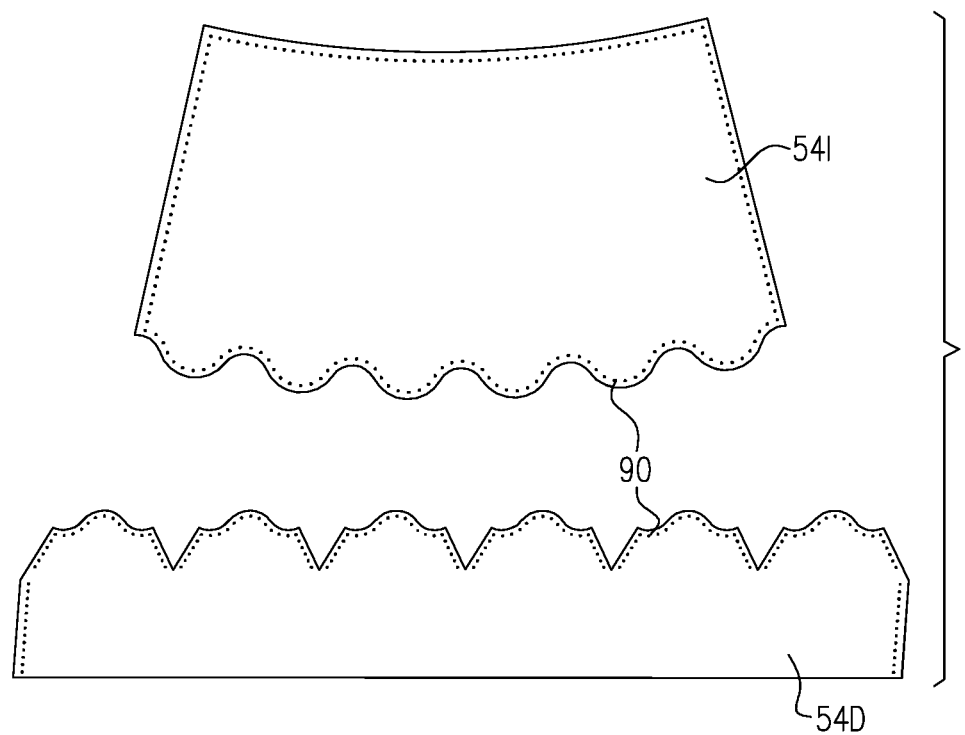
FIG. 8B is a schematic illustration of pieces of a covering material for the intermediate portion and for the downstream anchor portion of a pressure-loss-reduction device, as the pieces of material appear when they are laid out flat, prior to being coupled to a frame of the device, in accordance with some applications of the present invention.

Reference is now made to FIG. 8A, which is a schematic illustration of intermediate portion 23 and downstream anchor 31 of device 20, in accordance with some applications of the present invention. FIG. 8A shows the device in the absence of upstream anchor 33, for illustrative purposes. Reference is also made to FIG. 8B, which is a schematic illustration of covering material 54 for intermediate portion 23 (indicated by 54I) and of covering material 54 for downstream anchor 31 (indicated by 54D), in accordance with some applications of the present invention. FIG. 8B shows the pieces of covering material as they appear when they are laid out flat, prior to being coupled to the frame of the device.

As indicated, for some applications, separate pieces of covering material are used to cover each of the intermediate portions and the downstream anchor of the device. The pieces of material are typically stitched to each other at the interface between the pieces of material. In some cases, the stitching increases the crimped profile of the device (i.e., the diameter of the device when the device is held in a radially-constrained configuration inside a delivery device, e.g., a catheter) at the longitudinal location of the stitching. For some applications, the longitudinal location of the interface between the pieces of material (and therefore the longitudinal location of the stitching, which is indicated by holes 90) varies around the circumference of the device. For example, as shown in FIGS. 8A-B, the pieces of material may be cut such as to have an undulating shape at the interface between the pieces of material and/or the stitching of the pieces to each other is performed in an undulating shape. In this manner, the stitching is distributed over more than one longitudinal location, thereby reducing the crimped profile of the interface between the pieces of material relative to if the stitching were to be performed at a single longitudinal location.

It is noted that the pieces of material that are stitched together both perform similar functions, in that both pieces of material cover the frame of the device and prevent blood flow through the surfaces of the device. Moreover, the pieces of material are typically made of the same material. Respective pieces of material are used for the respective portions of the device because the respective portions of the device have different diameters from each other. The scope of the present application includes applying similar apparatus and methods to those described with reference to FIGS. 8A-B to a different device that includes respective pieces of material for respective portions of the device that have different diameters from each other.

Figure 9:
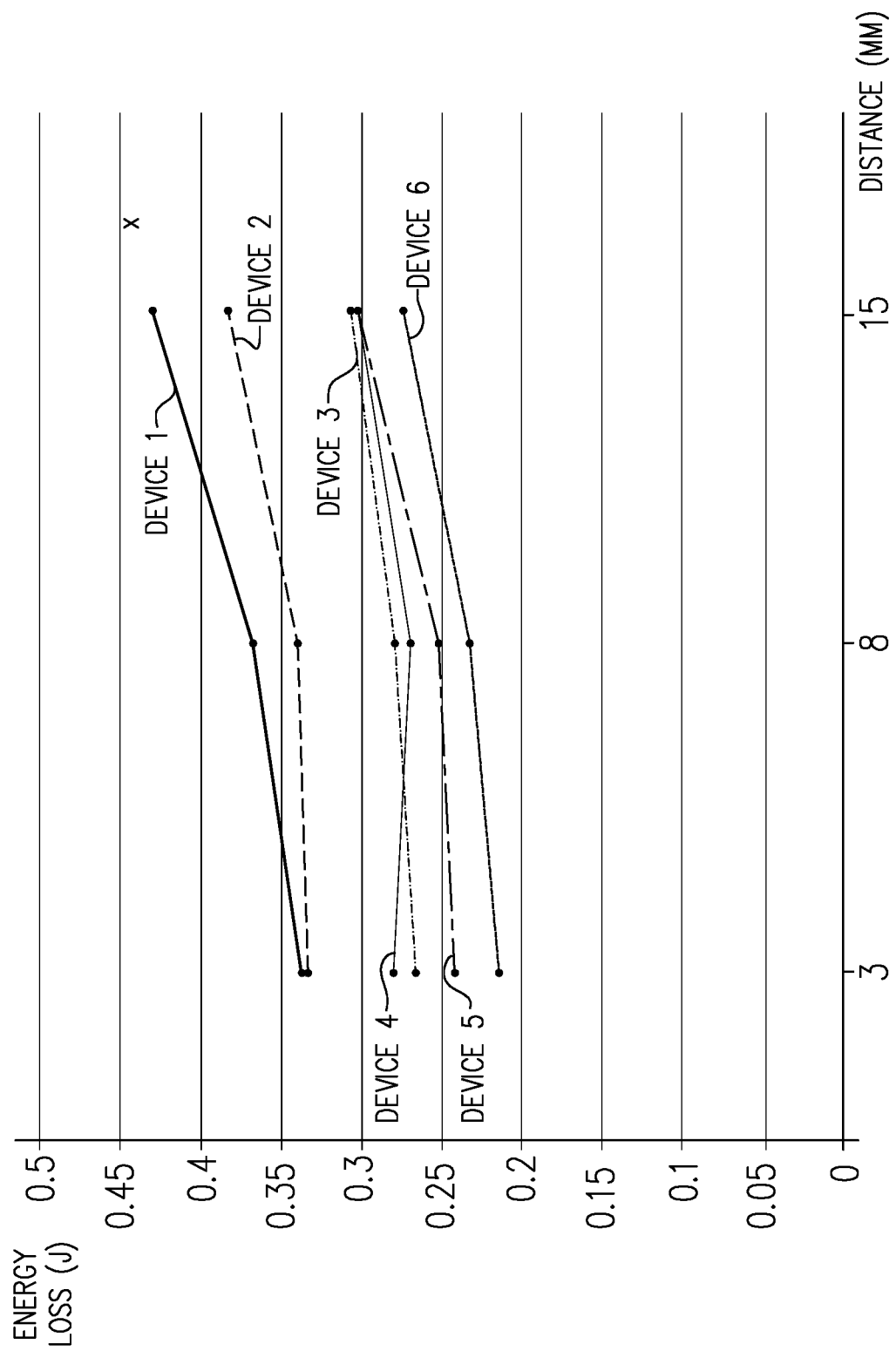
FIG. 9 is a graph showing results of an experiment that was performed, in accordance with some applications of the present invention.

Reference is now made to FIG. 9, which is a graph showing results of an experiment that was performed, in accordance with some applications of the present invention. A model of an aorta with a stenosed aortic valve was made using a pipe having a diameter of 27 mm, and a surgical bioprosthetic valve that was sewn to mimic severe aortic stenosis. Flow was measured using a first flow sensor disposed at an upstream location directly upstream of the valve, and a second flow sensor that was placed at a downstream location, at a location sufficiently downstream of the valve that the flow had lost a substantial amount of its pulsatility. Similarly, pressure was measured using a first pressure sensor disposed at the upstream location upstream of the valve (and therefore measuring pressure that is representative of ventricular pressure), and a second pressure sensor that was placed at the downstream location, downstream of the valve (and therefore measuring pressure that is representative of pressure in the aorta, downstream of the aortic valve). Flow and pressure were measured during pulsatile flow, the pulsatile flow being generated by a pulse duplicator system manufactured by LifeTec Group™. A compliant tube was placed downstream of the second pressure sensor and upstream of the second flow sensor, the compliance of the tube being such as to mimic the compliance of an aorta that has a systolic blood pressure of 120 mmHg, and a diastolic blood pressure of 80 mmHg.

Energy loss per pulse, between the upstream location and the downstream location, was calculated using the following equation:

$$E_{Loss} = \int_{C1}^{C2} Q(t) * \Delta P(t) dt$$

where Q is flow calculated based upon a combination of the flow measurements that were performed by the first and second flow sensors, and $\Delta P$ is the difference between the pressure measured by the second sensor and the pressure measured by the first pressure sensor.

Energy loss was calculated (a) when no device was placed between the valve and the downstream location, and (b) when various devices having diverging conduits as described herein were placed between the valve and the downstream location. The devices had the following characteristics:

Device 1—Length of diverging portion of the conduit 25 mm, diameter of conduit at upstream end of diverging portion 11.5 mm.

Device 2—Length of diverging portion of the conduit 25 mm, diameter of conduit at upstream end of diverging portion 13 mm.

Device 3—Length of diverging portion of the conduit 50 mm, diameter of conduit at upstream end of diverging portion 11.5 mm.

Device 4—Length of diverging portion of the conduit 25 mm, diameter of conduit at upstream end of diverging portion 14 mm.

Device 5—Length of diverging portion of the conduit 50 mm, diameter of conduit at upstream end of diverging portion 13 mm.

Device 6—Length of diverging portion of the conduit 50 mm, diameter of conduit at upstream end of diverging portion 14 mm.

For the energy loss measurements that were performed for when the devices were placed between the valve and the downstream location, each of the devices was placed such that the upstream end of the conduit of the device was at various distances from the valve, and the energy loss was calculated for the respective devices at the respective distances from the valve.

The energy loss per pulse when no device was placed between the valve and the downstream location was approximately 0.44 Joules per pulse, indicated by the "x" in the upper right of the graph. The energy loss per pulse for the respective devices is shown in the curves of the graph. It may be observed that (a) placing a device as described herein between the valve and the downstream location reduces energy loss, and (b) in general, the closer that the upstream end of the conduit of the device is to the valve, the lower the energy loss. Therefore, as described hereinabove, in accordance with some applications of the present invention, device 20 includes a folded portion at its upstream end, as described hereinabove. The folded portion facilitates placement of the device within the ascending aorta such that (a) the upstream anchor is placed sufficiently far from the aortic valve such that the anchor does not impede blood flow to the coronary arteries, but (b) the upstream end of the device's conduit is close to the aortic valve orifice.

For some applications, using the apparatus and methods described herein, device 20 is implanted such that the upstream end of upstream anchor 33 is deployed within 5 mm of the subject's sinotubular junction, either upstream of the subject's sinotubular junction, or downstream of the subject's sinotubular junction. For some applications, device 20 is implanted such that the upstream end of conduit 26 is deployed within 25 mm of the subject's aortic valve orifice.

Figure 10B:
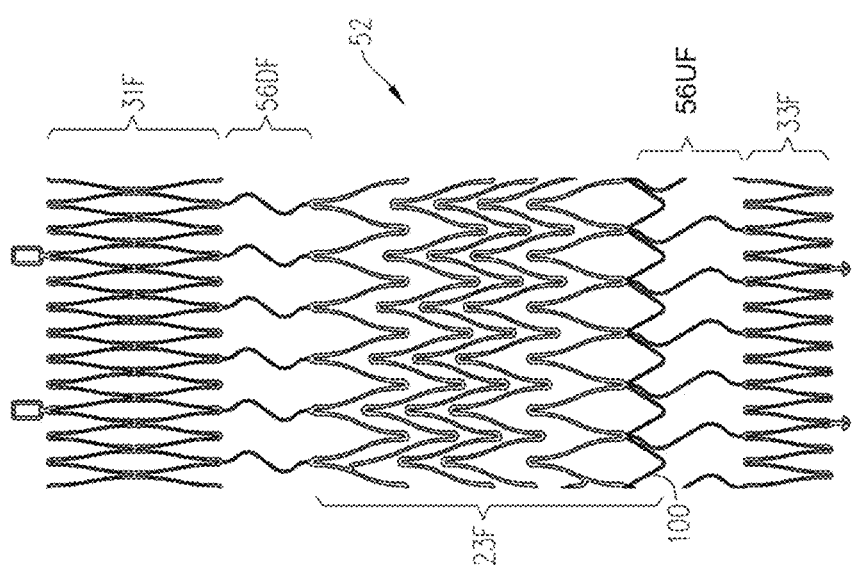
FIGS. 10A-B are schematic illustrations of a slice of a pressure-loss-reduction device (FIG. 10A) and a frame of the device (FIG. 10B), a portion of the frame being configured to extend a conduit of the device proximally beyond an upstream folded portion of the device, in accordance with some applications of the present invention.
Figure 10A:
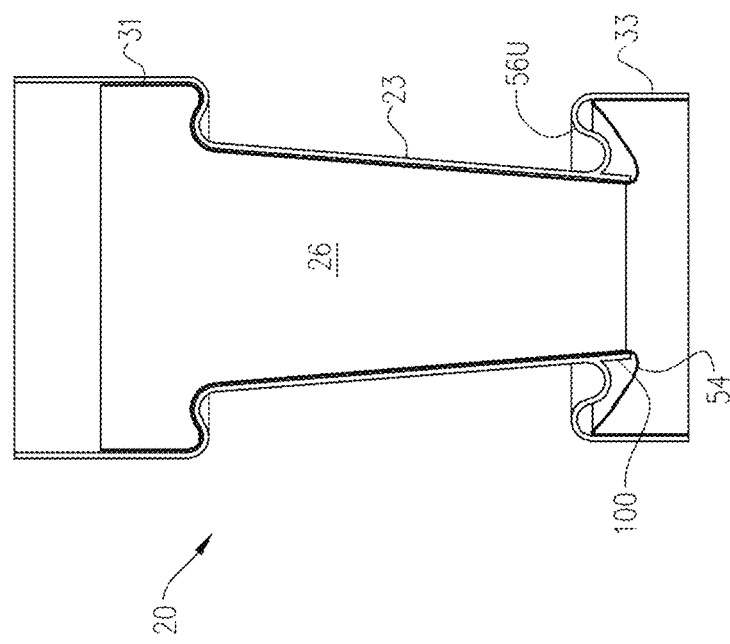

Reference is now made to FIGS. 10A-B, which are schematic illustrations of a slice of pressure-loss-reduction device 20 (FIG. 10A) and frame 52 of pressure-loss-reduction device 20 (FIG. 10B), intermediate frame portion 23F (which corresponds to intermediate portion 23 of the device) being configured to extend conduit 26 proximally beyond the upstream folded portion 56U of the device, in accordance with some applications of the present invention. As described hereinabove with reference to FIG. 9, typically, folded portion 56U of device 20 facilitates placement of the device within the ascending aorta such that (a) the upstream anchor is placed sufficiently far from the aortic valve such that the anchor does not impede blood flow to the coronary arteries, but (b) the upstream end of the device's conduit is close to the aortic valve orifice. For some applications, in order for the upstream end of the conduit to be placed still closer to the aortic valve orifice, the frame of the intermediate portion of the device includes one or more rows of extension struts 100 that are configured to extend conduit 26 proximally beyond the upstream folded portion 56U of the device, when device 20 is disposed in its non-radially-constrained configuration. Covering material 54 is typically coupled to the frame of the device, such that the covering material extends from the inside of frame portion 33F (corresponding to upstream anchor 33) to the extension struts 100, as shown in FIG. 10A. For some applications, extension struts 100 extend conduit 26 proximally beyond the upstream end of the upstream folded portion 56U of the device by at least 0.1 mm (e.g., at least 3 mm), when device 20 is disposed in its non-radially-constrained configuration. For some applications, extension struts 100 extend conduit 26 proximally beyond the upstream end of the upstream folded portion 56U of the device by 0.1-15 mm or by 3-10 mm, when device 20 is disposed in its non-radially-constrained configuration.

For some applications (not shown), generally similar techniques are used to extend intermediate portion 23 of device 20 distally, such that conduit 26 extends distally beyond downstream folded portion 56D of the device.

For some applications, covering material 54 is placed both on the inside of frame 52, and on the outside of the frame.

It is noted that, although device 20 is generally described herein as being implanted in the subject's aorta (e.g., ascending aorta), the scope of the present invention includes placing device 20 inside a longitudinal portion of any blood vessel of a subject, such that the device causes blood to flow in an antegrade direction through conduit 26, and such that, within the longitudinal portion in which the device is placed, blood flow via any flow-path other than through the conduit is prevented by the deployment of the device within the portion.

The terms "proximal" and "distal" are generally used in the present application to refer to the location of the respective elements in the aorta with respect to the aortic valve. That is, the term "proximal" refers to an element that is "upstream" and closer to the aortic valve, and the term "distal" refers to an element that is "downstream" and further from the aortic valve. Thus, the term "proximal" is used synonymously with the term "upstream" and the term "distal" is used synonymously with the term "downstream." In cases in which the device is placed in a different position within the subject's body, the terms "proximal" and "distal" are to be understood with respect to the direction of blood flow, a location that is relatively upstream being considered "proximal" and a location that is relatively downstream being considered "distal." It is noted that when used with reference to a delivery device, such as a catheter, the term "distal" is used to refer to the end of the delivery device that is inserted the furthest into the subject's body.

For some applications, the apparatus and methods described herein are combined with apparatus and methods described in the following applications, all of which are incorporated herein by reference:

The present application is related to WO 19/097424 to Karavany, filed Nov. 14, 2018, entitled "Aortic pressure loss reduction apparatus and methods," which claims priority from:

U.S. Provisional Application 62/586,258 to Karavany, filed Nov. 15, 2017, entitled "Aortic implant;" and U.S. Provisional Application 62/630,406 to Karavany, filed Feb. 14, 2018, entitled "Aortic implant."

US 2019/0183629 to Karavany, which is the U.S. national phase of WO 18/029688, filed Aug. 10, 2017, which claims priority from U.S. Provisional Application 62/373,993 to Karavany, filed Aug. 12, 2016, entitled "Aortic implant."

U.S. Pat. No. 10,568,731 to Karavany, which is the U.S. national phase of WO 16/128983, and which claims priority from:

U.S. Provisional Application 62/115,207 to Karavany, filed Feb. 12, 2015, entitled "Aortic implant," and U.S. Provisional Application 62/265,571 to Karavany, filed Dec. 10, 2015, entitled "Aortic implant."

It will be appreciated by persons skilled in the art that the present invention is not limited to what has been particularly shown and described hereinabove. Rather, the scope of the present invention includes both combinations and subcombinations of the various features described hereinabove, as well as variations and modifications thereof that are not in the prior art, which would occur to persons skilled in the art upon reading the foregoing description.

The invention claimed is:

1. Apparatus comprising:
 an aortic pressure-loss-reduction device configured to be implanted inside an ascending aorta of a subject, the aortic pressure-loss-reduction device comprising:
 a frame that is configured, in a non-constrained configuration thereof, to define:
 an upstream anchor portion configured to radially expand against an inner wall of the subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against the inner wall of the subject's ascending aorta, such as to anchor a downstream end of the aortic pressure-loss-reduction device to the subject's ascending aorta;
a first set of angled struts disposed between a downstream end of the upstream anchor portion and an upstream end of the intermediate portion, the angled struts being shaped to form a folded portion between the downstream end of the upstream anchor portion and the upstream end of the intermediate portion;
the angled struts being configured such that, in response to a diameter of the upstream anchor portion changing by an absolute amount, an absolute change in a diameter of the upstream end of the intermediate portion is less than the absolute amount by which the diameter of the upstream anchor portion changes; and
a material layer coupled to at least a portion of the frame, the material layer configured to impede blood flow therethrough,
wherein, in the non-constrained configuration of the frame, the angled struts define a circumferential curvature with respect to a longitudinal axis of the frame.

2. The apparatus according to claim 1, wherein the angled struts define a sinusoidal curvature.

3. The apparatus according to claim 1, wherein the angled struts are configured such that a ratio of the absolute change in the diameter of the upstream end of the intermediate portion to the absolute amount by which the diameter of the upstream anchor portion changes is less than 1:2.

4. The apparatus according to claim 1, wherein the angled struts are configured such that in response to the diameter of the upstream anchor portion decreasing, the diameter of the upstream end of the intermediate portion increases.

5. The apparatus according to claim 1, wherein the material layer is coupled to an outside of at least a portion of the frame.

6. The apparatus according to claim 1, wherein the material layer is coupled to an inside of at least a portion of the frame.

7. The apparatus according to claim 1, wherein at least a portion of the frame is embedded within the material layer.

8. The apparatus according to claim 1, wherein the angled struts are configured such that, when the frame is in the non-radially-constrained configuration, a distance from an upstream end of the upstream anchor portion to the upstream end of the intermediate portion is less than 15 mm.

9. The apparatus according to claim 1, wherein the angled struts are configured such that, when the frame is in the non-radially-constrained configuration, an upstream end of the conduit extends beyond an upstream end of the upstream anchor portion in the upstream direction.

10. The apparatus according to claim 1, wherein the angled struts are configured such that, in response to the diameter of the upstream anchor portion decreasing, the circumferential curvature of the struts with respect to the longitudinal axis of the frame increases.

11. The apparatus according to claim 1, wherein the angled struts are configured such that, by virtue of an increase in the circumferential curvature of the struts with respect to longitudinal axis of the frame, the difference between the diameter of the upstream end of the intermediate portion and the diameter of the upstream anchor portion decreases.

12. Apparatus comprising:
an aortic pressure-loss-reduction device configured to be implanted inside an ascending aorta of a subject, the aortic pressure-loss-reduction device comprising:
a frame that is configured, in a non-constrained configuration thereof, to define:
an upstream anchor portion configured to radially expand against an inner wall of the subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against the inner wall of the subject's ascending aorta, such as to anchor a downstream end of the aortic pressure-loss-reduction device to the subject's ascending aorta;
a first set of angled struts disposed between a downstream end of the upstream anchor portion and an upstream end of the intermediate portion, the angled struts being shaped to form a folded portion between the downstream end of the upstream anchor portion and the upstream end of the intermediate portion;
the angled struts being configured such that, in response to a diameter of the upstream anchor portion changing by an absolute amount, an absolute change in a diameter of the upstream end of the intermediate portion is less than the absolute amount by which the diameter of the upstream anchor portion changes; and
a material layer coupled to at least a portion of the frame, the material layer configured to impede blood flow therethrough,
wherein the upstream end of the intermediate portion is reinforced with respect to at least a longitudinally-central portion of the intermediate portion.

13. The apparatus according to claim 12, wherein the upstream end of the intermediate portion and the longitudinally-central portion of the intermediate portion comprise a first set of struts, and wherein the upstream end of the intermediate portion is reinforced with respect to at least the longitudinally-central portion of the intermediate portion by the first set of struts of the upstream end of the intermediate portion being reinforced with supporting struts that face in an opposite direction from the first set of struts of the upstream end of the intermediate portion.

14. The apparatus according to claim 12, wherein the upstream end of the intermediate portion and the longitudinally-central portion of the intermediate portion comprise struts, and wherein the upstream end of the intermediate portion is reinforced with respect to at least the longitudinally-central portion of the intermediate portion by the struts of the upstream end of the intermediate portion forming closed cells.

15. The apparatus according to claim 12, wherein the upstream end of the intermediate portion and the longitudinally-central portion of the intermediate portion comprise struts, and wherein the upstream end of the intermediate portion is reinforced with respect to at least the longitudinally-central portion of the intermediate portion by the struts of the upstream end of the intermediate portion being shorter than the struts of the longitudinally-central portion of the intermediate portion.

16. The apparatus according to claim 12, wherein the upstream end of the intermediate portion and the longitudinally-central portion of the intermediate portion comprise struts, and wherein the upstream end of the intermediate portion is reinforced with respect to at least the longitudinally-central portion of the intermediate portion by the struts of the upstream end of the intermediate portion being wider than the struts of the longitudinally-central portion of the intermediate portion.

17. Apparatus comprising:
an aortic pressure-loss-reduction device configured to be implanted inside an ascending aorta of a subject, the aortic pressure-loss-reduction device comprising:
a frame that is configured, in a non-constrained configuration thereof, to define:
an upstream anchor portion configured to radially expand against an inner wall of the subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against the inner wall of the subject's ascending aorta, such as to anchor a downstream end of the aortic pressure-loss-reduction device to the subject's ascending aorta;
a first set of angled struts disposed between a downstream end of the upstream anchor portion and an upstream end of the intermediate portion, the angled struts being shaped to form a folded portion between the downstream end of the upstream anchor portion and the upstream end of the intermediate portion;
the angled struts being configured such that, in response to a diameter of the upstream anchor portion changing by an absolute amount, an absolute change in a diameter of the upstream end of the intermediate portion is less than the absolute amount by which the diameter of the upstream anchor portion changes;
a material layer coupled to at least a portion of the frame, the material layer configured to impede blood flow therethrough; and
a second set of angled struts disposed between an upstream end of the downstream anchor portion and a downstream end of the intermediate portion, the second set of angled struts being shaped to form a folded portion between the upstream end of the downstream anchor portion and the downstream end of the intermediate portion.

18. The apparatus according to claim 17, wherein, in the non-constrained configuration of the frame, the first set of angled struts define a circumferential curvature with respect to a longitudinal axis of the frame in a given circumferential direction, and the second set of angled struts define a circumferential curvature with respect to the longitudinal axis of the frame in the given circumferential direction.

19. The apparatus according to claim 17, wherein the second set of angled struts are configured such that, in response to a diameter of the downstream anchor portion changing by an absolute amount, an absolute change in a diameter of the downstream end of the intermediate portion is less than the absolute amount by which the diameter of the downstream anchor portion changes.

20. The apparatus according to claim 17, wherein the second set of angled struts are configured such that, in response to diameters of both the upstream and the downstream anchor portions decreasing, torque that is generated at the upstream end of the intermediate portion, by the first set of angled struts, is at least partially cancelled by torque generated at the downstream end of the intermediate portion, by the second set of angled struts.

21. The apparatus according to claim 17, wherein the aortic pressure-loss-reduction device is configured, such that the intermediate portion of the device is (a) longitudinally fixed with respect to the ascending aorta by the upstream anchor portion and the downstream anchor portion exerting radial force against the inner wall of the aorta and (b) able to adjust the angle that a longitudinal axis of the intermediate portion makes with longitudinal axes of the upstream and downstream anchor portions, by the first and second sets of angled struts acting as hinges about which the intermediate portion can flex.

22. The apparatus according to claim 17, wherein the aortic pressure-loss-reduction device is configured such that, by virtue of flexibility of first and second sets of angled struts, a length of the intermediate portion does not change even if a distance between the upstream and downstream anchor portions changes.

23. The apparatus according to claim 17, wherein the struts belonging to the first set of angled struts are longer than the struts belonging to the second set of angled struts.

24. Apparatus comprising:
an aortic pressure-loss-reduction device configured to be implanted inside an ascending aorta of a subject, the aortic pressure-loss-reduction device comprising:
a frame that is configured, in a non-constrained configuration thereof, to define:
an upstream anchor portion configured to radially expand against an inner wall of the subject's ascending aorta, such as to anchor an upstream end of the aortic pressure-loss-reduction device to the subject's ascending aorta;
an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;
a downstream anchor portion configured to radially expand against the inner wall of the subject's ascending aorta, such as to anchor a downstream end of the aortic pressure-loss-reduction device to the subject's ascending aorta;
a first set of angled struts disposed between a downstream end of the upstream anchor portion and an upstream end of the intermediate portion, the angled struts being shaped to form a folded portion between the downstream end of the upstream anchor portion and the upstream end of the intermediate portion;

the angled struts being configured such that, in response to a diameter of the upstream anchor portion changing by an absolute amount, an absolute change in a diameter of the upstream end of the intermediate portion is less than the absolute amount by which the diameter of the upstream anchor portion changes; and a material layer coupled to at least a portion of the frame, the material layer configured to impede blood flow therethrough, wherein the intermediate portion of the frame is configured to be flexible, by the intermediate portion of the frame including struts that form a spiral, such that at least upon the aortic pressure-loss-reduction device being implanted inside the subject's ascending aorta, the intermediate portion of the frame curves such as to conform with a curvature of the ascending aorta.

25. Apparatus comprising:

an aortic pressure-loss-reduction device configured to be implanted inside an ascending aorta of a subject, the aortic pressure-loss-reduction device comprising:

a frame that is configured, in a non-constrained configuration thereof, to define:

an upstream anchor portion configured to radially expand against an inner wall of the subject's ascending aorta, such as to anchor an upstream end of the aortic pressure-loss-reduction device to the subject's ascending aorta;

an intermediate portion configured to define a conduit therethrough, such that blood is configured to flow through the device via the conduit, at least a portion of the conduit diverging, such that a downstream end of the diverging portion has a greater cross-sectional area than an upstream end of the diverging portion;

a downstream anchor portion configured to radially expand against the inner wall of the subject's ascending aorta, such as to anchor a downstream end of the aortic pressure-loss-reduction device to the subject's ascending aorta;

a first piece of material coupled to the frame, the first piece of material configured to impede blood flow therethrough; and a second piece of material coupled to the frame, the second piece of material configured to impede blood flow therethrough, the second piece of material being stitched to the first piece of material at a longitudinal location that varies around a circumference of the device when the device is disposed in a radially-constrained configuration.

* * * * *